US012710975B2

(12) United States Patent
Han et al.

(10) Patent No.: US 12,710,975 B2
(45) Date of Patent: Aug. 18, 2026

(54) SIGNAL PROCESSING DEVICE AND DISPLAY APPARATUS FOR VEHICLE INCLUDING THE SAME

(71) Applicant: LG Electronics Inc., Seoul (KR)

(72) Inventors: Dongwoo Han, Seoul (KR); Sangkyeong Jeong, Seoul (KR); Ganghee Yu, Seoul (KR); Dongkyu Lee, Seoul (KR); Jaegu Yoon, Seoul (KR); Dukyung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 306 days.

(21) Appl. No.: 18/278,334

(22) PCT Filed: Dec. 28, 2021

(86) PCT No.: PCT/KR2021/020076

§ 371 (c)(1),
(2) Date: Aug. 22, 2023

(87) PCT Pub. No.: WO2022/181961

PCT Pub. Date: Sep. 1, 2022

(65) Prior Publication Data

US 2024/0143374 A1 May 2, 2024

(30) Foreign Application Priority Data

Feb. 26, 2021 (KR) ........................ 10-2021-0026453
Apr. 23, 2021 (KR) ........................ 10-2021-0053004

(51) Int. Cl.
*G06F 9/00* (2018.01)
*B60K 35/21* (2024.01)
(Continued)

(52) U.S. Cl.
CPC ........ *G06F 9/45558* (2013.01); *B60K 35/213* (2024.01); *B60K 35/22* (2024.01);
(Continued)

(58) Field of Classification Search
CPC ...... G06F 9/45558; G06F 2009/45595; G09G 2370/022; G09G 2380/10
See application file for complete search history.

(56) References Cited

U.S. PATENT DOCUMENTS 8,200,796 B1 6/2012 Margulis
10,169,066 B2 1/2019 Atsmon et al.
(Continued)

FOREIGN PATENT DOCUMENTS

CN 101800730 A 8/2010
CN 103856547 A 6/2014
(Continued)

OTHER PUBLICATIONS

Extended European Search Report in European Appln. No. 21878752.1, mailed on Feb. 2, 2024, 8 pages.
(Continued)

*Primary Examiner* — Alexander Khong
(74) *Attorney, Agent, or Firm* — Fish & Richardson P.C.

(57) ABSTRACT

A signal processing device includes a processor configured to perform signal processing for a first display and a second display that are configured to be located in a vehicle. The processor is configured to execute first, second, and third virtual machines on a hypervisor in the processor, the second virtual machine is configured to be operated for the first display, and the third virtual machine is configured to be operated for the second display. The first virtual machine is configured to generate a virtual overlay, change at least one of a layer sequence or a display area of the virtual overlay, and transmit, to the second virtual machine or the third virtual machine, the changed virtual overlay for displaying the changed virtual overlay on the first display or the second display.

20 Claims, 28 Drawing Sheets

(51) Int. Cl.

| | |
|---|---|
| ***B60K 35/22*** | (2024.01) |
| ***B60K 35/29*** | (2024.01) |
| ***G06F 3/14*** | (2006.01) |
| ***G06F 9/455*** | (2018.01) |
| ***G06F 9/54*** | (2006.01) |
| *B60K 35/00* | (2006.01) |
| *B60R 16/023* | (2006.01) |
| *G09G 5/14* | (2006.01) |
| *G09G 5/377* | (2006.01) |

(52) U.S. Cl.

CPC ............ *B60K 35/29* (2024.01); *G06F 3/1423* (2013.01); *G06F 9/544* (2013.01); *B60K 35/00* (2013.01); *B60K 2360/18* (2024.01); *B60R 16/023* (2013.01); *G06F 3/1438* (2013.01); *G06F 3/1454* (2013.01); *G06F 2009/4557* (2013.01); *G06F 2009/45579* (2013.01); *G06F 2009/45583* (2013.01); *G06F 2009/45595* (2013.01); *G09G 5/14* (2013.01); *G09G 5/377* (2013.01); *G09G 2360/06* (2013.01); *G09G 2370/022* (2013.01); *G09G 2380/10* (2013.01)

(56) References Cited

U.S. PATENT DOCUMENTS

| | | | |
|---|---|---|---|
| 11,403,148 | B2 | 8/2022 | Lenz et al. |
| 11,544,028 | B2 | 1/2023 | Mues et al. |
| 11,550,610 | B2 | 1/2023 | Goldmann et al. |
| 11,755,355 | B2 | 9/2023 | McDaid et al. |
| 12,067,428 | B2 | 8/2024 | Gurtovoy et al. |
| 12,112,185 | B2 | 10/2024 | Kobayashi et al. |
| 12,289,200 | B2 * | 4/2025 | Mifsud ................. G06F 9/5044 |
| 2008/0320194 | A1 | 12/2008 | Vega et al. |
| 2011/0022809 | A1 | 1/2011 | Satoh et al. |
| 2011/0072426 | A1 | 3/2011 | Huang et al. |
| 2011/0320823 | A1 | 12/2011 | Saroiu et al. |
| 2012/0092277 | A1 | 4/2012 | Momchilov |
| 2012/0198480 | A1 | 8/2012 | Yasaki et al. |
| 2013/0031552 | A1 | 1/2013 | Kato |
| 2014/0149490 | A1 | 5/2014 | Luxenberg et al. |
| 2015/0012973 | A1 | 1/2015 | Derrin et al. |
| 2015/0015479 | A1 | 1/2015 | Cho |
| 2015/0178883 | A1 | 6/2015 | McKenzie et al. |
| 2015/0205630 | A1 * | 7/2015 | Hu ...................... G06F 9/45558 718/1 |
| 2016/0034295 | A1 | 2/2016 | Cochran |
| 2016/0328254 | A1 * | 11/2016 | Ahmed ............... G06F 9/45545 |
| 2016/0359759 | A1 | 12/2016 | Singh et al. |
| 2016/0364200 | A1 | 12/2016 | Beveridge et al. |
| 2017/0039084 | A1 | 2/2017 | Atsmon et al. |
| 2018/0204361 | A1 * | 7/2018 | Tinsman ................. A63F 13/65 |
| 2019/0250408 | A1 * | 8/2019 | Lafon .................. G02B 27/017 |
| 2019/0258251 | A1 | 8/2019 | Ditty et al. |
| 2019/0379683 | A1 | 12/2019 | Overby et al. |
| 2020/0026546 | A1 | 1/2020 | Lee et al. |
| 2020/0117495 | A1 | 4/2020 | Samii et al. |
| 2020/0159562 | A1 | 5/2020 | Lee et al. |
| 2020/0192722 | A1 | 6/2020 | Lenz et al. |
| 2020/0218443 | A1 | 7/2020 | Narayan et al. |
| 2020/0219322 | A1 | 7/2020 | Verma et al. |
| 2020/0219469 | A1 * | 7/2020 | Mittal .................... G09G 5/006 |
| 2020/0293357 | A1 | 9/2020 | Goldmann et al. |
| 2020/0326898 | A1 | 10/2020 | Mues et al. |
| 2020/0326968 | A1 | 10/2020 | Hayes et al. |
| 2020/0326969 | A1 | 10/2020 | Hayes et al. |
| 2021/0219002 | A1 * | 7/2021 | Barnes ............. B64D 11/00155 |
| 2021/0240512 | A1 * | 8/2021 | Onda ................... G07C 5/0808 |
| 2021/0264559 | A1 * | 8/2021 | Roper ................. G06F 9/45558 |
| 2022/0308910 | A1 * | 9/2022 | Rottkamp ............. G06F 13/385 |
| 2023/0333552 | A1 * | 10/2023 | Duguid ................ G05D 1/0044 |

FOREIGN PATENT DOCUMENTS

| | | | |
|---|---|---|---|
| CN | 107077577 | A | 8/2017 |
| CN | 107850634 | A | 3/2018 |
| EP | 3470980 | A1 | 4/2019 |
| JP | 2017-507401 | A | 3/2017 |
| JP | 6523298 | B2 | 5/2019 |
| KR | 10-2011-0056843 | | 5/2011 |
| KR | 10-2011-0088930 | | 8/2011 |
| KR | 10-2014-0000328 | | 1/2014 |
| KR | 10-2020-0058157 | A | 5/2020 |
| WO | 2015/103374 | A1 | 7/2015 |
| WO | WO 2015/103376 | | 7/2015 |

OTHER PUBLICATIONS

International Search Report and Written Opinion in International Appln. No. PCT/KR2021/014950, mailed on Feb. 17, 2022, 14 pages (with English translation).

"The Definitive Guide to the Xen Hypervisor," David Chisnall, Jan. 1, 2008, retrieved on Sep. 7, 2020, retrieved from URL<https://www.mobt3ath.com/uplode/book/book-55475.pdf>, 307 pages, particular pp. 19-73.

citeseerx.ist.psu.edu [online], "Vsense: Virtualizing Stateful Sensors with Actuators," Jul. 16, 2009, retrieved on Oct. 19, 2023, retrieved from URL<https://citeseerx.ist.psu.edu/documentrepid=repl&type=pdf&doi-b5d27161f4bf3404e6f84ce71a2f763caaf7475a>, 14 pages.

Extended European Search Report in European Appln. No. 22715510.8, mailed on Oct. 30, 2023, 9 pages.

mobt3ath.com [online], "The Definitive Guide to the Xen Hypervisor," Jan. 1, 2008, retrieved on Sep. 7, 2020, retrieved from URL<https://www.mobt3ath.com/uplode/book/book-55475.pdf>, 307 pages.

Mounier et al., "Hardware-Assisted Virtualization for Heterogeneous Automotive Applications," Paper, Presented at 2019 14th International Conference on Computer Engineering and Systems (ICCES), Cairo, Egypt, Dec. 17-17, 2019, pp. 195-200.

Office Action in U.S. Appl. No. 17/755,046, mailed on Mar. 17, 2025, 59 pages.

Office Action in U.S. Appl. No. 17/771,450, mailed on May 8, 2025, 8 pages.

Office Action in U.S. Appl. No. 17/755,046, mailed on Aug. 6, 2025, 47 pages.

Office Action in U.S. Appl. No. 17/771,450, mailed on Dec. 20, 2024, 58 pages.

Office Action in U.S. Appl. No. 17/755,046, mailed on Jan. 9, 2026, 53 pages.

Office Action in U.S. Appl. No. 18/278,336, mailed on Dec. 19, 2025, 66 pages.

Office Action in Korean Appln. No. 10-2023-7031948, mailed on Apr. 21, 2026, 16 pages (with English translation).

Office Action in U.S. Appl. No. 17/755,046, mailed on Jun. 12, 2026, 53 pages.

* cited by examiner

SIGNAL PROCESSING DEVICE AND DISPLAY APPARATUS FOR VEHICLE INCLUDING THE SAME

CROSS-REFERENCE TO RELATED APPLICATIONS

This application is a National Stage application under 35 U.S.C. § 371 of International Application No. PCT/KR2021/020076, filed on Dec. 28, 2021, which claims the benefit of Korean Patent Application No. 10-2021-0026453, filed on Feb. 26, 2021, and Korean Patent Application No. 10-2021-0053004, filed on Apr. 23, 2021. The disclosures of the prior applications are incorporated by reference in their entirety.

TECHNICAL FIELD

The present disclosure relates to a signal processing device and a display apparatus for vehicle including the same, and more particularly, to a signal processing device capable of changing the display sequence and display area of a plurality of overlays and a display apparatus for vehicle including the same.

BACKGROUND

A vehicle is an apparatus that a driver moves in a desired direction. A representative example of the vehicle is a car.

In some implementations, a display apparatus for vehicle is mounted in the vehicle for convenience of users who use the vehicle.

For example, a display is disposed in a cluster to display various kinds of information. By way of further example, to display vehicle driving information, various displays, such as an audio video navigation (AVN) display, are mounted in the vehicle, in addition to the cluster.

In the case in which the number of displays in the display apparatus for vehicle is increased, however, signal processing for the displays may be complicated.

In particular, when a plurality of overlays are displayed on a plurality of displays, signal processing may be complicated.

SUMMARY

The present disclosure is directed to a signal processing device capable of changing the display sequence and display area of a plurality of overlays and a display apparatus for vehicle including the same.

The present disclosure is also directed to a signal processing device capable of changing the display sequence and display area of a plurality of overlays even though the number of virtual machines is increased and a display apparatus for vehicle including the same.

The present disclosure is also directed to a signal processing device capable of changing the display sequence and display area of a plurality of overlays even though operating systems of a plurality of virtual machines are different from each other and a display apparatus for vehicle including the same.

According to one aspect of the subject matter described in this application, a signal processing device can include a processor configured to perform signal processing for a first display and a second display that are configured to be located in a vehicle. The processor can be configured to execute first, second, and third virtual machines on a hypervisor in the processor, the second virtual machine can be configured to be operated for the first display, and the third virtual machine can be configured to be operated for the second display. The first virtual machine can be configured to generate a virtual overlay, change at least one of a layer sequence or a display area of the virtual overlay, and transmit, to the second virtual machine or the third virtual machine, the changed virtual overlay for displaying the changed virtual overlay on the first display or the second display.

Implementations according to this aspect can include one or more of the following features. For example, the second virtual machine or the third virtual machine can be configured to combine the changed virtual overlay with a physical overlay, and control the first display or the second display to display a composite overlay related to the combined overlay.

In some implementations, combining the changed virtual overlay with the physical overlay can include mapping the virtual overlay to the physical overlay. In some implementations, combining the changed virtual overlay with the physical overlay can include mapping the virtual overlay to one or more overlays in the physical overlay.

In some implementations, the first virtual machine can be configured to delete the virtual overlay or add another virtual overlay. In some examples, each of the second virtual machine and the third virtual machine can be configured to generate a virtual overlay, and the first virtual machine can be configured to set at least one of an overlay sequence or a display area of the virtual overlays generated by the second virtual machine and the third virtual machine.

In some implementations, the first virtual machine can be configured to change the at least one of the overlay sequence or the display area of the virtual overlays generated by the second virtual machine and the third virtual machine. In some examples, the processor can be configured to execute a fourth virtual machine configured to be operated for a third display configured to be located in the vehicle, each of the second, third, and fourth virtual machines can be configured to generate a virtual overlay, and the first virtual machine can be configured to set at least one of an overlay sequence or a display area of the virtual overlays generated by the second, third, and fourth virtual machines.

In some examples, the first virtual machine can be configured to change a construction of a layer displayed on the first display or the second display while the first display or the second display is operated. In some examples, the first virtual machine can be configured to generate the virtual overlay displayed on the first display and the second display.

In some implementations, the first virtual machine can be configured to move the generated virtual overlay and control the first display or the second display to display the moved virtual overlay. In some implementations, the first virtual machine can be configured to generate a first virtual overlay comprising vehicle speed information, the second virtual machine can be configured to generate a second virtual overlay comprising content information or contact information, the third virtual machine can be configured to generate a third virtual overlay comprising map information, and the first virtual machine can be configured to control the first display or the second display to display at least one of the first, second, or third virtual overlays.

In some examples, the first virtual machine can be configured to control the first display to display the vehicle speed information and the contact information, and control the second display to display the map information and speed limit information. In some implementations, the processor can be configured to execute a fourth virtual machine configured to be operated for a third display configured to be located in the vehicle, the first virtual machine can be configured to generate a first virtual overlay comprising vehicle speed information, the second virtual machine can be configured to generate a second virtual overlay comprising content information or contact information, the third virtual machine can be configured to generate a third virtual overlay comprising map information, and the first virtual machine can be configured to control the first, second, and third displays to display at least one of the first, second, or third virtual overlays.

In some examples, the first virtual machine can be configured to control the first display to display the vehicle speed information above the map information, control the second display to display the contact information above the map information, and control the third display to display the map information. In some examples, the first virtual machine can be configured to, based on message information being received, control second display to display the message information above the contact information or the map information.

In some implementations, the first virtual machine can be configured to move an object on a plurality of virtual overlays, and control a plurality of displays to display the moved object. In some implementations, the first virtual machine can include a display manager that includes an overlay controller configured to control an overlay, a layer controller configured to control a layer, and a composition controller configured to control a construction or sequence of the layer, and each of the second virtual machine and the third virtual machine can include a window manager configured to display a window of the layer.

According to another aspect of the subject matter described in this application, a signal processing device can include a processor configured to perform signal processing for a first display and a second display that are configured to be located in a vehicle. The processor can be configured to execute first, second, and third virtual machines on a hypervisor in the processor, the second virtual machine can be configured to be operated for the first display, the third virtual machine can be configured to be operated for the second display, the first virtual machine can be configured to generate a virtual overlay and transmit the virtual overlay to the second virtual machine or the third virtual machine, and the second virtual machine or the third virtual machine can be configured to, based on the virtual overlay being displayed on the first display or the second display, change at least one of a layer sequence or a display area of the virtual overlay.

According to another aspect of the subject matter described in this application, a display apparatus for vehicle can include a first display, a second display, and a signal processing device comprising a processor configured to perform signal processing for the first display and the second display. The processor can be configured to execute first, second, and third virtual machines on a hypervisor in the processor, the second virtual machine can be configured to be operated for the first display, the third virtual machine can be configured to be operated for the second display, and the first virtual machine can be configured to generate a virtual overlay, change at least one of a layer sequence or a display area of the virtual overlay, and transmit, to the second virtual machine or the third virtual machine, the changed virtual overlay or information regarding the changed virtual overlay for displaying the changed virtual overlay on the first display or the second display.

DETAILED DESCRIPTION

Figure 1A:
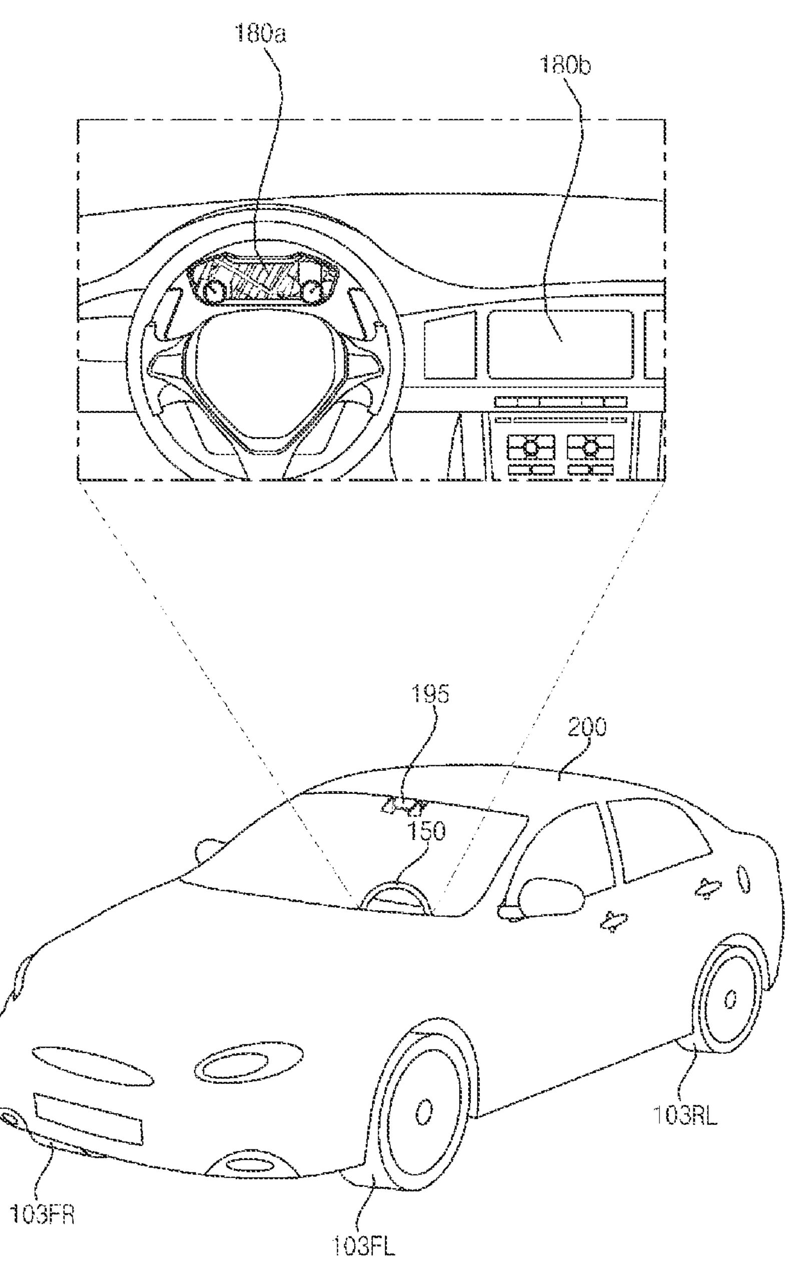
FIG. 1A is a diagram illustrating an example of the exterior and interior of a vehicle.

FIG. 1A is a diagram illustrating an example of the exterior and interior of a vehicle.

Referring to the figure, the vehicle 200 can be moved by a plurality of wheels 103FR, 103FL, 103RL, . . . rotated by a power source and a steering wheel 150 configured to adjust an advancing direction of the vehicle 200.

In some implementations, the vehicle 200 can be provided with a camera 195 configured to acquire an image of the front of the vehicle.

In some implementations, the vehicle 200 can be further provided therein with a plurality of displays 180*a* and 180*b* configured to display images and information.

In FIG. 1A, a cluster display 180*a* and an audio video navigation (AVN) display 180*b* are illustrated as the plurality of displays 180*a* and 180*b*. In addition, a head up display (HUD) can also be used.

In some implementations, the audio video navigation (AVN) display 180*b* can also be called a center information display.

In some implementations, a display apparatus 100 for vehicle including a plurality of displays 180*a* and 180*b* can divide data processing. This will be described with reference to FIG. 12 and subsequent figures.

In some implementations, the vehicle 200 described in this specification can be a concept including all of a vehicle having an engine as a power source, a hybrid vehicle having an engine and an electric motor as a power source, and an electric vehicle having an electric motor as a power source.

Figure 1B:
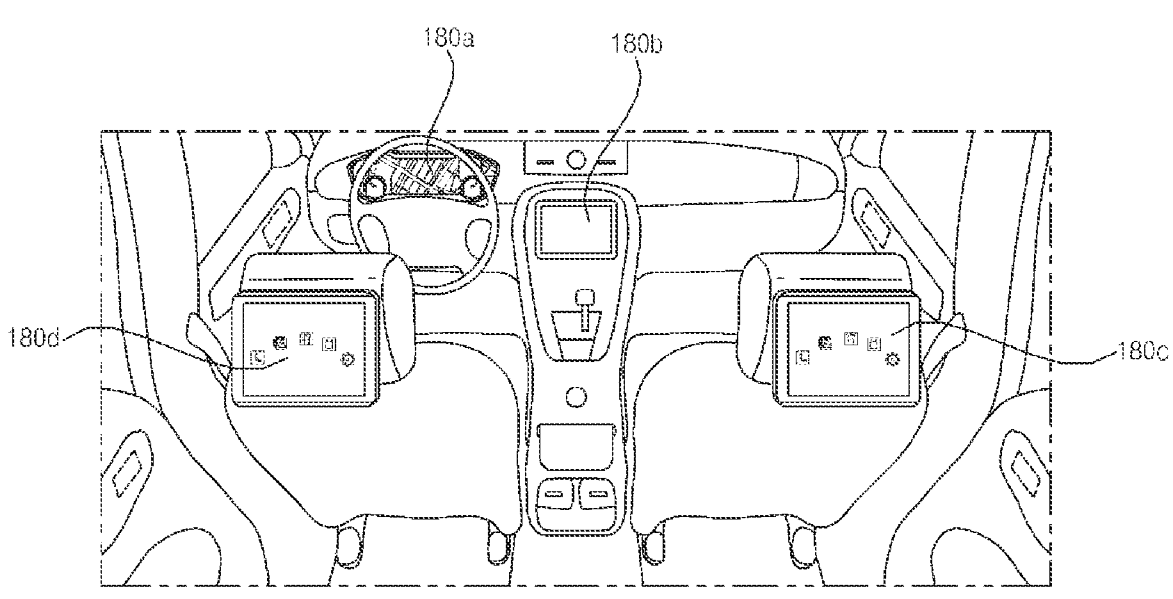
FIG. 1B is a diagram illustrating another example of the interior of the vehicle.

FIG. 1B is a diagram illustrating another example of the interior of the vehicle.

Referring to the figure, a cluster display 180*a*, an audio video navigation (AVN) display 180*b*, rear seat entertainment displays 180*c* and 180*d*, and a rear-view mirror display can be mounted in the vehicle.

In some implementations, a display apparatus 100 for vehicle including a plurality of displays 180*a* to 180*d* can change the display sequence and display area of a plurality of overlays. This will be described with reference to FIG. 5 and subsequent figures.

Figure 2:
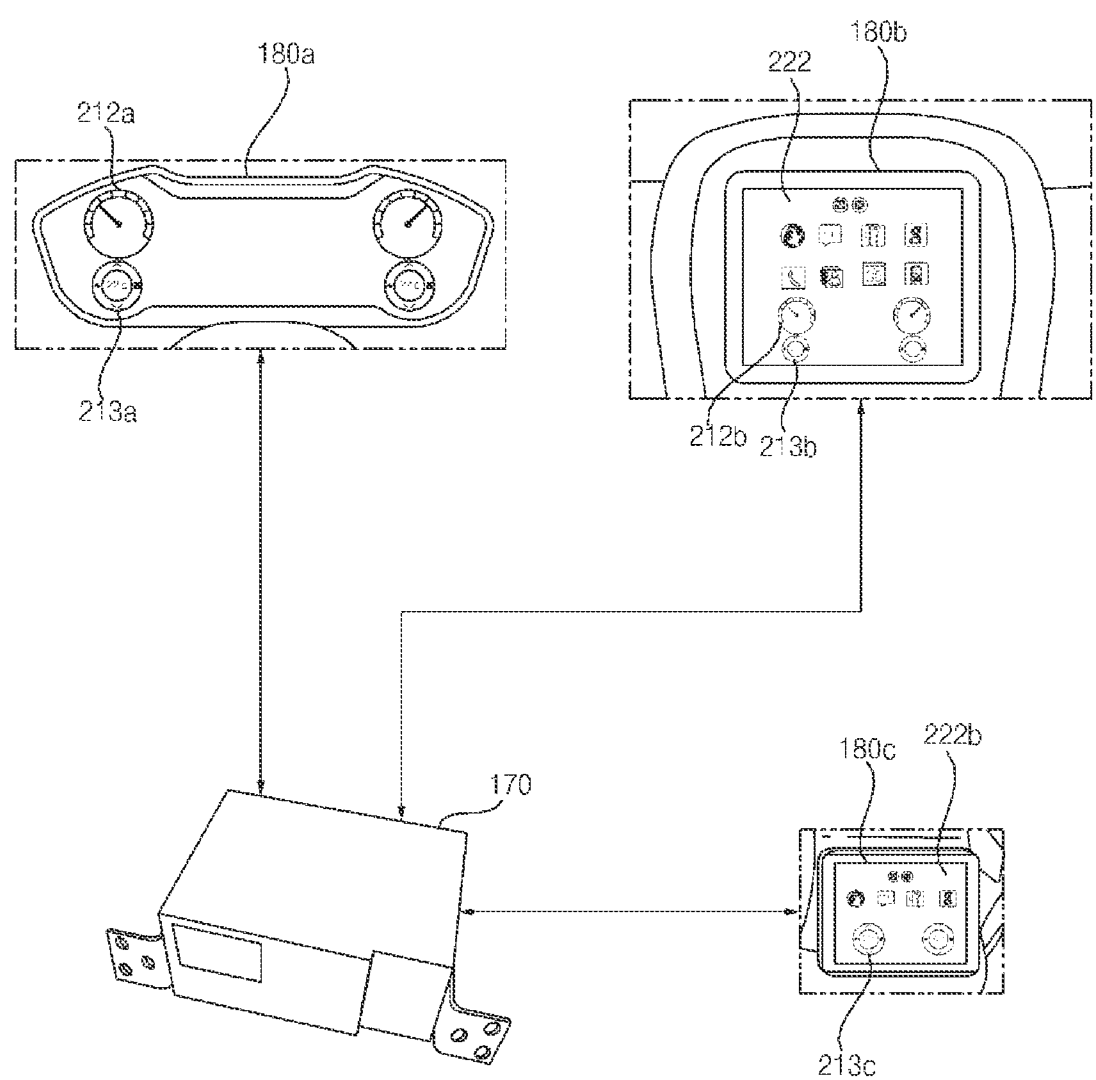
FIG. 2 is a diagram illustrating an example of an external appearance of a display apparatus for vehicle.

FIG. 2 is a diagram illustrating the external appearance of a display apparatus for vehicle.

The display apparatus 100 for vehicle can include a plurality of displays 180*a* and 180*b* and a signal processing device 170 configured to perform signal processing to display images and information on the plurality of displays 180*a* and 180*b*.

The first display 180*a*, which is one of the plurality of displays 180*a* and 180*b*, can be a cluster display 180*a* configured to display a driving state and operation information, and the second display 180*b* can be an audio video navigation (AVN) display 180*b* configured to display vehicle driving information, a navigation map, various kinds of entertainment information, or an image.

The signal processing device 170 can have a processor 175 provided therein, and first to third virtual machines 520 to 540 can be executed by a hypervisor 505 in the processor 175.

The second virtual machine 530 can be operated for the first display 180*a*, and the third virtual machine 540 can be operated for the second display 180*b*.

In some implementations, the first virtual machine 520 in the processor 175 can be configured to set a shared memory 508 based on the hypervisor 505 for transmission of the same data to the second virtual machine 530 and the third virtual machine 540. Consequently, the first display 180*a* and the second display 180*b* in the vehicle can be configured to display the same information or the same images in a synchronized state.

In some implementations, the first virtual machine 520 in the processor 175 shares at least some of data with the second virtual machine 530 and the third virtual machine 540 for divided processing of data. Consequently, the plurality of virtual machines for the plurality of displays in the vehicle can divide and process data.

In some implementations, the first virtual machine 520 in the processor 175 can receive and process wheel speed sensor data of the vehicle, and can transmit the processed wheel speed sensor data to at least one of the second virtual machine 530 or the third virtual machine 540. Consequently, at least one virtual machine can share the wheel speed sensor data of the vehicle.

In some implementations, the display apparatus 100 for vehicle can further include a rear seat entertainment (RSE) display 180*c* configured to display driving state information, simple navigation information, various kinds of entertainment information, or an image.

The signal processing device 170 can further execute a fourth virtual machine, in addition to the first to third virtual machines 520 to 540, on the hypervisor 505 in the processor 175 to control the RSE display 180*c*.

Consequently, displays 180*a* to 180*c* can be controlled using a single signal processing device 170.

In some implementations, some of the plurality of displays 180*a* to 180*c* can be operated based on a Linux Operating System (OS), and others can be operated based on a Web Operating System (OS).

In response to touch being input to any one of the displays 180*a* and 180*b* or 180*a*, 180*b*, and 180*c* configured to be operated under various operating systems, the signal processing device 170 can be configured to rapidly and accurately process the touch input.

In some implementations, as depicted in FIG. 2, a vehicle speed indicator 212*a* and an in-vehicle temperature indicator 213*a* can be displayed on the first display 180*a*, a home screen 222 including a plurality of applications, a vehicle speed indicator 212*b*, and an in-vehicle temperature indicator 213*b* can be displayed on the second display 180*b*, and a second home screen 222*b* including a plurality of applications and an in-vehicle temperature indicator 213*c* can be displayed on the third display 180*c*.

Figure 3:
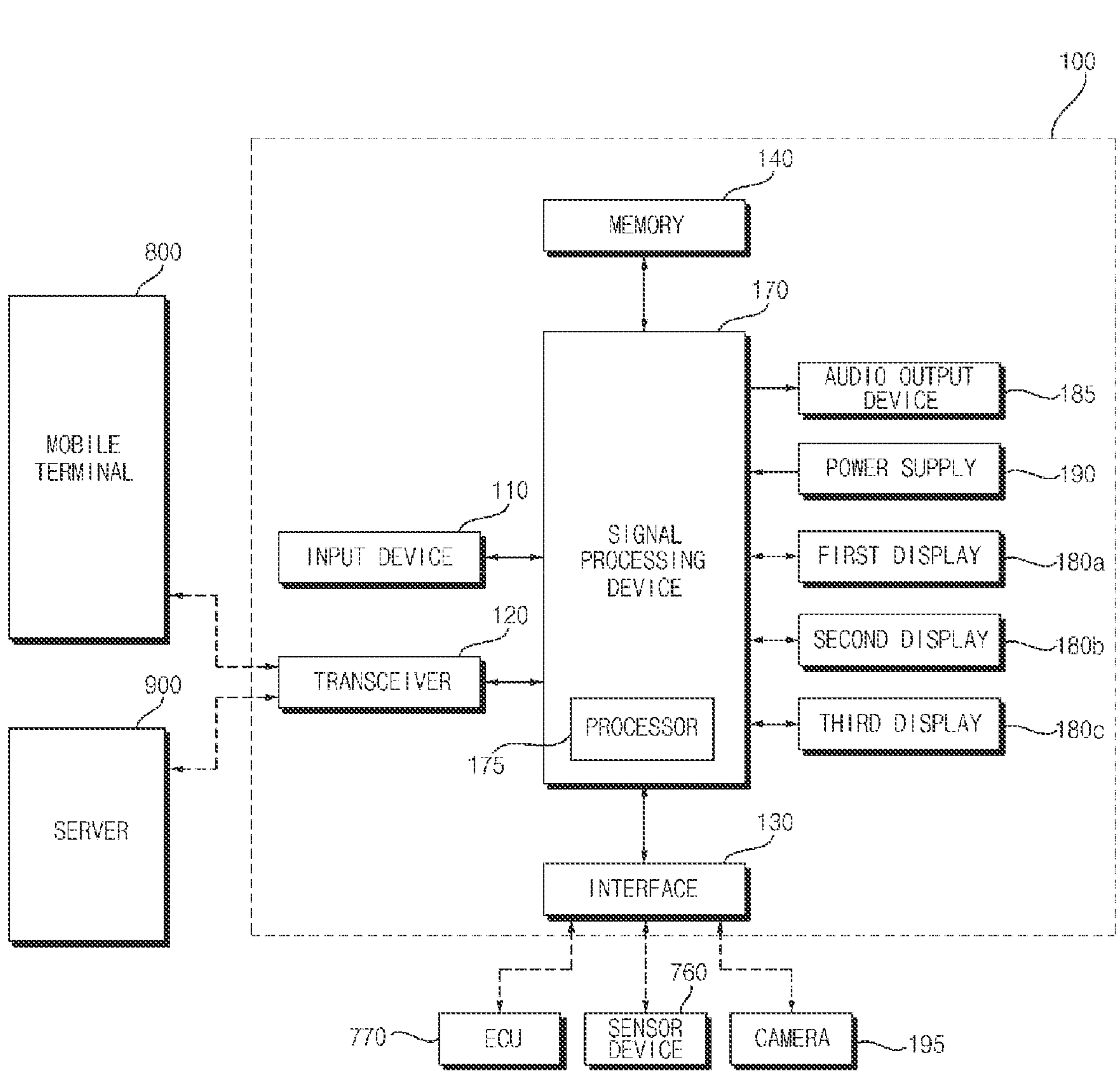
FIG. 3 is a diagram illustrating an example of an internal block diagram of the display apparatus for vehicle of FIG. 2.

FIG. 3 illustrates an example of an internal block diagram of the display apparatus for vehicle.

Referring to the figure, the display apparatus 100 for vehicle can include an input device 110, a transceiver 120, an interface 130, a memory 140, a signal processing device 170, a plurality of displays 180*a* to 180*c*, an audio output device 185, and a power supply 190.

The input device 110 can include a physical button or pad for button input or touch input.

In some implementations, the input device 110 can include a touch sensor configured to sense touch input to the displays 180*a*, 180*b*, and 180*c*.

In some implementations, the input device 110 can include a microphone configured to receive user voice.

The transceiver 120 can wirelessly exchange data with a mobile terminal 800 or a server 900.

In particular, the transceiver 120 can wirelessly exchange data with a mobile terminal of a vehicle driver. Any of various data communication schemes, such as Bluetooth, Wi-Fi, WIFI Direct, and APIX, can be used as a wireless data communication scheme.

The transceiver 120 can receive weather information and road traffic situation information, such as transport protocol expert group (TPEG) information, from the mobile terminal 800 or the server 900. For example, the transceiver 120 can include a mobile communication module.

The interface 130 can receive sensor information from an electronic control unit (ECU) 770 or a sensor device 760, and can transmit the received information to the signal processing device 170.

In some implementations, the sensor information can include at least one of vehicle direction information, vehicle position information (global positioning system (GPS) information), vehicle angle information, vehicle velocity information, vehicle acceleration information, vehicle inclination information, vehicle forward/backward movement information, battery information, fuel information, tire information, vehicle lamp information, in-vehicle temperature information, or in-vehicle humidity information.

The sensor information can be acquired from a heading sensor, a yaw sensor, a gyro sensor, a position sensor, a vehicle forward/backward movement sensor, a wheel sensor, a vehicle velocity sensor, a car body inclination sensor, a battery sensor, a fuel sensor, a tire sensor, a steering-wheel-rotation-based steering sensor, an in-vehicle temperature sensor, or an in-vehicle humidity sensor. In some implementations, the position module can include a GPS module configured to receive GPS information.

In some implementations, the interface 130 can receive front-of-vehicle image data, side-of-vehicle image data, rear-of-vehicle image data, and obstacle-around-vehicle distance information from a camera 195 or lidar, and can transmit the received information to the signal processing device 170.

The memory 140 can store various data necessary for overall operation of the display apparatus 100 for vehicle, such as programs for processing or control of the signal processing device 170.

For example, the memory 140 can store data about the hypervisor and first to third virtual machines executed by the hypervisor in the processor 175.

The audio output device 185 can convert an electrical signal from the signal processing device 170 into an audio signal, and can output the audio signal. For example, the audio output device 185 can include a speaker.

The power supply 190 can supply power necessary to operate components under control of the signal processing device 170. In particular, the power supply 190 can receive power from a battery in the vehicle.

The signal processing device 170 can control overall operation of each device in the display apparatus 100 for vehicle.

For example, the signal processing device 170 can include a processor 175 configured to perform signal processing for the displays 180*a* and 180*b*.

The processor 175 can execute the first to third virtual machines 520 to 540 on the hypervisor 505 (see FIG. 5) in the processor 175.

Figure 5:
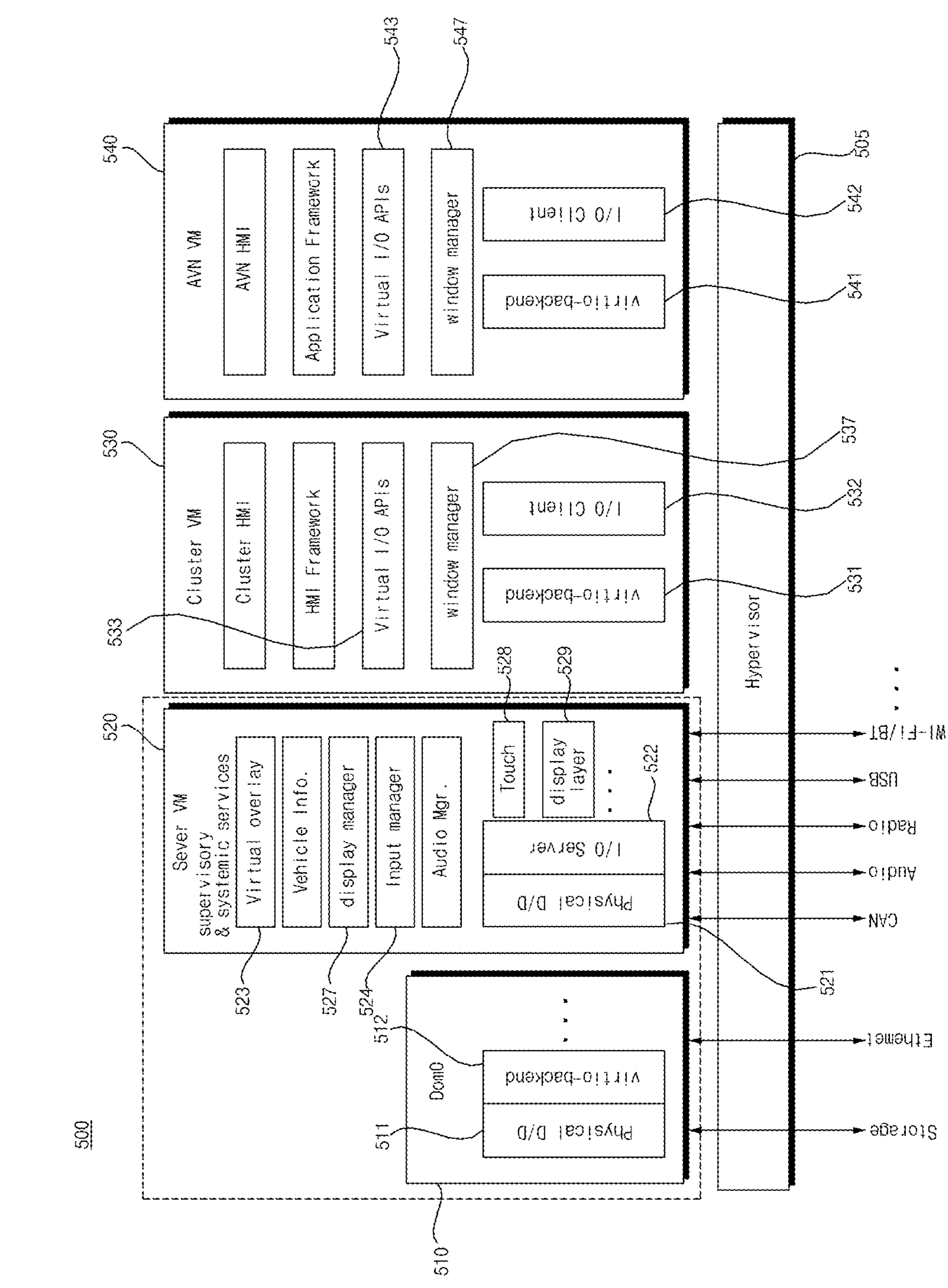
FIG. 5 is a diagram illustrating another example of a system driven in a signal processing device.

In some implementations, the processor 175 can further execute a legacy virtual machine configured to receive and process Ethernet data. For example, as shown in FIG. 5, the legacy virtual machine can be executed by the first virtual machine 520 in the processor 175.

Among the first to third virtual machines 520 to 540 (see FIG. 5), the first virtual machine 520 can be called a server virtual machine, and the second and third virtual machines 530 and 540 can be called guest virtual machines.

The second virtual machine 530 can be operated for the first display 180*a*, and the third virtual machine 540 can be operated for the second display 180*b*.

For example, the first virtual machine 520 in the processor 175 can receive, process, and output vehicle sensor data, position information data, camera image data, audio data, or touch input data. Data processed only by a legacy virtual machine and data processed by the first virtual machine 520 can be distinguished from each other, whereby data processing can be efficiently performed. In particular, the first virtual machine 520 can process most of the data, whereby 1:N data sharing can be achieved.

As another example, the first virtual machine 520 can directly receive and process controller area network (CAN) communication data, audio data, radio data, USB data, and wireless communication data for the second and third virtual machines 530 and 540.

The first virtual machine 520 can transmit the processed data to the second and third virtual machines 530 and 540.

Consequently, only the first virtual machine 520, among the first to third virtual machines 520 to 540, can receive communication data and external input data, and can perform signal processing, whereby load in signal processing by the other virtual machines can be reduced and 1:N data communication can be achieved, and therefore synchronization at the time of data sharing can be achieved.

In some implementations, the first virtual machine 520 writes some of data in a first shared memory to be transmitted to the second virtual machine 530, and writes some other of data in the first shared memory to be transmitted to the third virtual machine 540. The second virtual machine 530 and the third virtual machine 540 are configured to process the received data, and write the processed data in a second shared memory. Consequently, the display sequence and display area of a plurality of overlays can be changed.

In some implementations, data can be any one of image data, audio data, navigation data, and voice recognition data.

In some implementations, the first virtual machine 520 can process some other of data, and can be configured to write the processed data in the second shared memory. For example, the first virtual machine 520 can perform data processing in addition to the second virtual machine 530 and the third virtual machine 540.

In some implementations, in response to a fourth virtual machine 550 configured to be operated for the third display 180*c* being executed in the processor 175, the first virtual machine 520 can write some other of data in the first shared memory, and the fourth virtual machine 550 can process the received data and can be configured to write the processed data in the second shared memory.

In some implementations, the first virtual machine 520 can generate command queues for distributed processing of data in the second virtual machine 530 and the third virtual machine 540. Consequently, the plurality of virtual machines can divide and process data.

In some implementations, in response to the second virtual machine 530 and the third virtual machine 540 sharing the same data, the first virtual machine 520 in the processor 175 can generate one command queue. Consequently, the same data can be synchronized and shared.

In some implementations, the first virtual machine 520 can generate command queues corresponding to the number of virtual machines for distributed processing of data.

In some implementations, the first virtual machine 520 can be configured to transmit at least some of data to at least one of the second virtual machine 530 or the third virtual machine 540 for distributed processing of data.

For example, the first virtual machine 520 can allocate the first shared memory for transmitting at least some of data to at least one of the second virtual machine 530 or the third virtual machine 540, and image data processed by the second virtual machine 530 or the third virtual machine 540 can be written in the second shared memory.

In some implementations, the first virtual machine 520 can be configured to write data in the shared memory 508, whereby the second virtual machine 530 and the third virtual machine 540 share the same data.

For example, the first virtual machine 520 can be configured to write radio data or wireless communication data in the shared memory 508, whereby the second virtual machine 530 and the third virtual machine 540 share the same data. Consequently, 1:N data sharing can be achieved.

In some implementations, the first virtual machine 520 can process most of the data, whereby 1:N data sharing can be achieved.

In some implementations, the first virtual machine 520 in the processor 175 can be configured to set the shared memory 508 based on the hypervisor 505 to transmit the same data to the second virtual machine 530 and the third virtual machine 540.

For example, the first virtual machine 520 in the processor 175 can transmit the same data to the second virtual machine 530 and the third virtual machine 540 in a synchronized state using the shared memory 508 based on the hypervisor 505. Consequently, the plurality of displays 180*a* and 180*b* in the vehicle can be configured to display the same images in a synchronized state.

In some implementations, the signal processing device 170 can process various signals, such as an audio signal, an image signal, and a data signal. For example, the signal processing device 170 can be implemented in the form of a system on chip (SOC).

Figure 4:
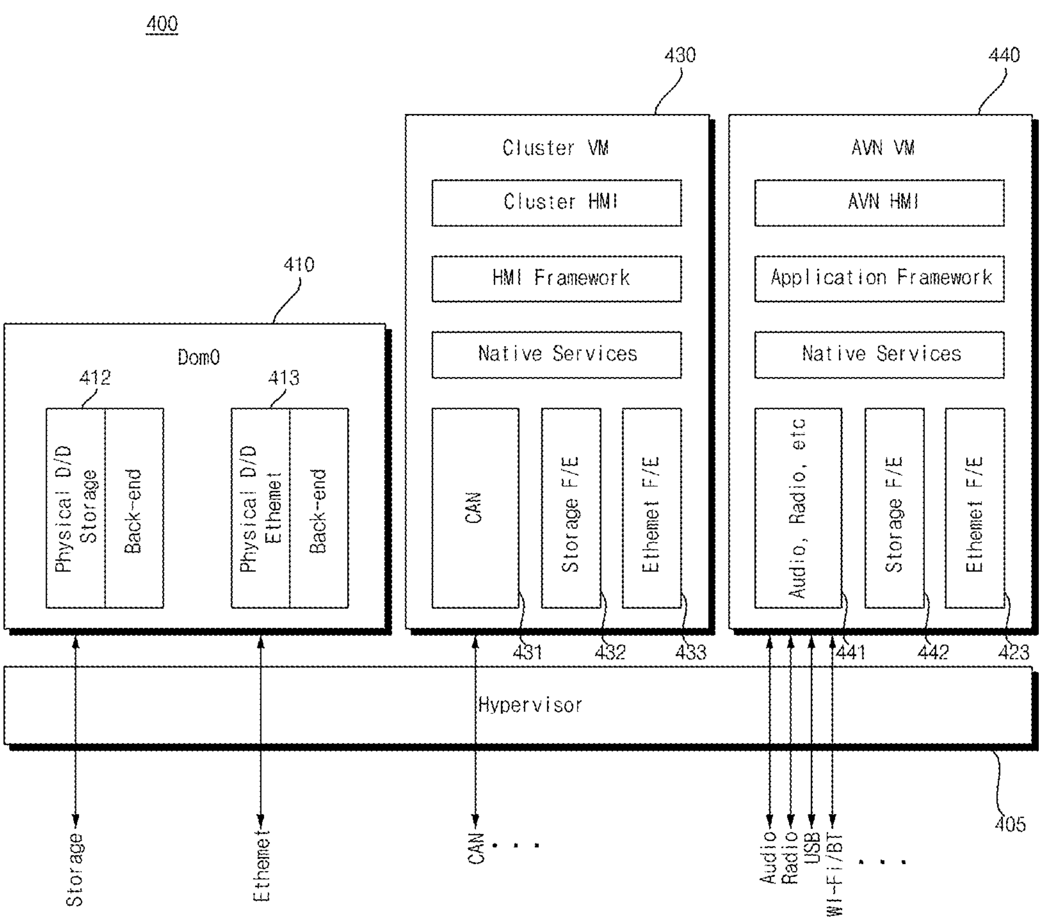
FIG. 4 is a diagram illustrating an example of a system driven in a signal processing device.

FIG. 4 is a diagram illustrating an example of a system driven in a signal processing device.

Referring to the figure, FIG. 4 is a diagram illustrating that virtual machines are used for the cluster display 180*a* and the AVN display 180*b*.

The system 400 driven in the signal processing device of FIG. 4 illustrates that a cluster virtual machine 430 and an AVN virtual machine 440 can be executed through a hypervisor 405 in the processor 175.

In some implementations, the system 400 driven in the signal processing device of FIG. 4 illustrates that a legacy virtual machine 410 can also be executed on the hypervisor 405 in the processor 175.

The legacy virtual machine 410 can include an interface 412 for data communication with the memory 140 and an interface 413 for Ethernet communication.

In some implementations, the cluster virtual machine 430 can include an interface 431 for CAN communication, an interface 432 for communication with the interface 412 of the legacy virtual machine 410, and an interface 433 for communication with the interface 413 of the legacy virtual machine 410.

In some implementations, the AVN virtual machine 440 can include an interface 441 for input and output of audio data, radio data, USB data, and wireless communication data, an interface 442 for communication with the interface 412 of the legacy virtual machine 410, and an interface 443 for communication with the interface 413 of the legacy virtual machine 410.

In the system 400, there may be a disadvantage in that CAN communication data are input and output only in the cluster virtual machine 430, whereby the CAN communication data cannot be utilized in the AVN virtual machine 440.

Also, in the system 400 of FIG. 4, there may be a disadvantage in that audio data, radio data, USB data, and wireless communication data are input and output only in the AVN virtual machine 440, whereby these data cannot be utilized in the cluster virtual machine 430.

In addition, there may be a disadvantage in that the cluster virtual machine 430 and the AVN virtual machine 440 must include the interfaces 431 and 432 and the interfaces 441 and 442, respectively, for memory data and Ethernet communication data input and output in the legacy virtual machine 410.

Therefore, the present disclosure proposes a scheme for improving the system of FIG. 4. For example, virtual machines can be classified into a server virtual machine and guest virtual machines such that various memory data and communication data are input and output not in the guest virtual machines but in the server virtual machine. This will be described with reference to FIG. 5 and subsequent figures.

FIG. 5 is a diagram illustrating another example of a system driven in a signal processing device.

Referring to the figure, the system 500 of FIG. 5 illustrates that the first virtual machine 520, which is a server virtual machine, the second virtual machine 530, which is a guest virtual machine, and the third virtual machine 540, which is a guest virtual machine, can be executed on the hypervisor 505 in the processor 175 of the signal processing device 170.

The second virtual machine 530 can be a virtual machine for the cluster display 180*a*, and the third virtual machine 540 can be a virtual machine for the AVN display 180*b*.

For example, the second virtual machine 530 and the third virtual machine 540 can be operated for image rendering of the cluster display 180*a* and the AVN display 180*b*, respectively.

In some implementations, the system 50 driven in the signal processing device 170 of FIG. 5 illustrates that a legacy virtual machine 510 can also be executed on the hypervisor 505 in the processor 175.

The legacy virtual machine 510 can include an interface 511 for data communication with the memory 140 and Ethernet communication.

The figure illustrates that the interface 511 is a physical device driver; however, various modifications are possible.

In some implementations, the legacy virtual machine 510 can further include a virtual input and output device backend (virtio-backend) interface 512 for data communication with the second and third virtual machines 530 and 540.

The first virtual machine 520 can include an interface 521 for input and output of audio data, radio data, USB data, and wireless communication data and an input and output server interface 522 for data communication with the guest virtual machines.

For example, the first virtual machine 520, which is a server virtual machine, can provide inputs/outputs (I/O) that can be difficult to virtualize with standard virtualization technology (VirtIO) to a plurality of guest virtual machines, such as the second and third virtual machines 530 and 540.

In some implementations, the first virtual machine 520, which is a server virtual machine, can control radio data and audio data at a supervisor level, and can provide the data to a plurality of guest virtual machines, such as the second and third virtual machines 530 and 540.

In some implementations, the first virtual machine 520, which is a server virtual machine, can process vehicle data, sensor data, and surroundings-of-vehicle information, and can provide the processed data or information to a plurality of guest virtual machines, such as the second and third virtual machines 530 and 540.

In some implementations, the first virtual machine 520 can provide supervisory services, such as processing of vehicle data and audio routing management.

Next, the second virtual machine 530 can include an input and output client interface 532 for data communication with the first virtual machine 520 and APIs 533 configured to control the input and output client interface 532.

In addition, the second virtual machine 530 can include a virtio-backend interface 532 for data communication with the legacy virtual machine 510.

The second virtual machine 530 can receive memory data by communication with the memory 140 or Ethernet data by Ethernet communication from the virtio-backend interface 512 of the legacy virtual machine 510 through the virtio-backend interface 532.

In some implementations, the third virtual machine 540 can include an input and output client interface 542 for data communication with the first virtual machine 520 and APIs 543 configured to control the input and output client interface 542.

In addition, the third virtual machine 540 can include a virtio-backend interface 541 for data communication with the legacy virtual machine 510.

The third virtual machine 540 can receive memory data by communication with the memory 140 or Ethernet data by Ethernet communication from the virtio-backend interface 512 of the legacy virtual machine 510 through the virtio-backend interface 541.

In some implementations, the legacy virtual machine 510 can be provided in the first virtual machine 520.

In the system 500, CAN communication data are input and output only in the first virtual machine 520, but can be provided to a plurality of guest virtual machines, such as the second and third virtual machines 530 and 540, through data processing in the first virtual machine 520. Consequently, 1:N data communication by processing of the first virtual machine 520 can be achieved.

Also, in the system 500 of FIG. 5, audio data, radio data, USB data, and wireless communication data are input and output only in the first virtual machine 520, but can be provided to a plurality of guest virtual machines, such as the second and third virtual machines 530 and 540, through data processing in the first virtual machine 520. Consequently, 1:N data communication by processing of the first virtual machine 520 can be achieved.

In some implementations, as depicted in FIG. 5, touch input to the first display 180*a* or the second display 180*b* is input only to the first virtual machine 520 and is not input to the second virtual machine 530 and the third virtual machine 540. Information regarding the touch input can be transmitted to the second virtual machine 530 or the third virtual machine 540.

Consequently, the touch input can be rapidly and accurately processed. In addition, the touch input can be rapidly and accurately processed even though the number of virtual machines that are driven is increased.

In some implementations, in the system 500 of FIG. 5, the second and third virtual machines 530 and 540 can be operated based on different operating systems.

For example, the second virtual machine 530 can be operated based on a Linux OS, and the third virtual machine 540 can be operated based on a Web OS.

In the first virtual machine 520, the shared memory 508 based on the hypervisor 505 can be set for data sharing, even though the second and third virtual machines 530 and 540 are operated based on different operating systems. Even though the second and third virtual machines 530 and 540 are operated based on different operating systems, therefore, the same data or the same images can be shared in a synchronized state. Eventually, the plurality of displays 180*a* and 180*b* can be configured to display the same data or the same images in a synchronized state.

In some implementations, the first virtual machine 520 transmits information regarding the touch input to the second virtual machine 530 or the third virtual machine 540 even though the second and third virtual machines 530 and 540 are operated based on different operating systems. Consequently, the touch input can be rapidly and accurately processed even though the second and third virtual machines 530 and 540 are operated based on different operating systems (OS).

In some implementations, the first virtual machine 520 can include a display manager 527 configured to control overlays displayed on the first display 180*a* and the second display 180*b*, a display layer server 529, and a virtual overlay creator 523 configured to generate a virtual overlay.

The display layer server 529 can receive a first overlay provided by the second virtual machine 530 and a second overlay provided by the third virtual machine 540.

In some implementations, the display layer server 529 can transmit a virtual overlay generated by the virtual overlay creator 523 to at least one of the second virtual machine 530 or the third virtual machine 540.

In some implementations, the display manager 527 in the first virtual machine 520 can receive the first overlay provided by the second virtual machine 530 and the second overlay provided by the third virtual machine 540 through the display layer server 529.

The display manager 527 in the first virtual machine 520 can be configured to transmit the virtual overlay, which is different from the first overlay or the second overlay, to at least one of the second virtual machine 530 or the third virtual machine 540 through the display layer server 529.

In response thereto, the second virtual machine 530 can be configured to combine and display the first overlay and the virtual overlay on the first display 180*a*.

In addition, the third virtual machine 540 can be configured to combine and display the second overlay and the virtual overlay on the second display 180*b*.

In some implementations, the first virtual machine 520 can include an input manager 524 configured to receive an input signal from the outside. At this time, the input signal can be an input signal from a predetermined button (start button) in the vehicle, a touch input signal, or a voice input signal.

For example, the input manager 524 in the first virtual machine 520 can receive touch input from the first display 180*a* or the second display 180*b*.

In some implementations, the first virtual machine 520 can include a touch server 528 configured to transmit information regarding the touch input related to the touch input from the first display 180*a* or the second display 180*b* to the second virtual machine 530 or the third virtual machine 540.

For example, when there is touch input corresponding to the first display 180*a*, the touch server 528 in the first virtual machine 520 can transmit information regarding the touch input to the second virtual machine 530.

In some implementations, the touch server 528 in the first virtual machine 520 can receive the touch input from the first display 180*a* or the second display 180*b*.

Figure 6:
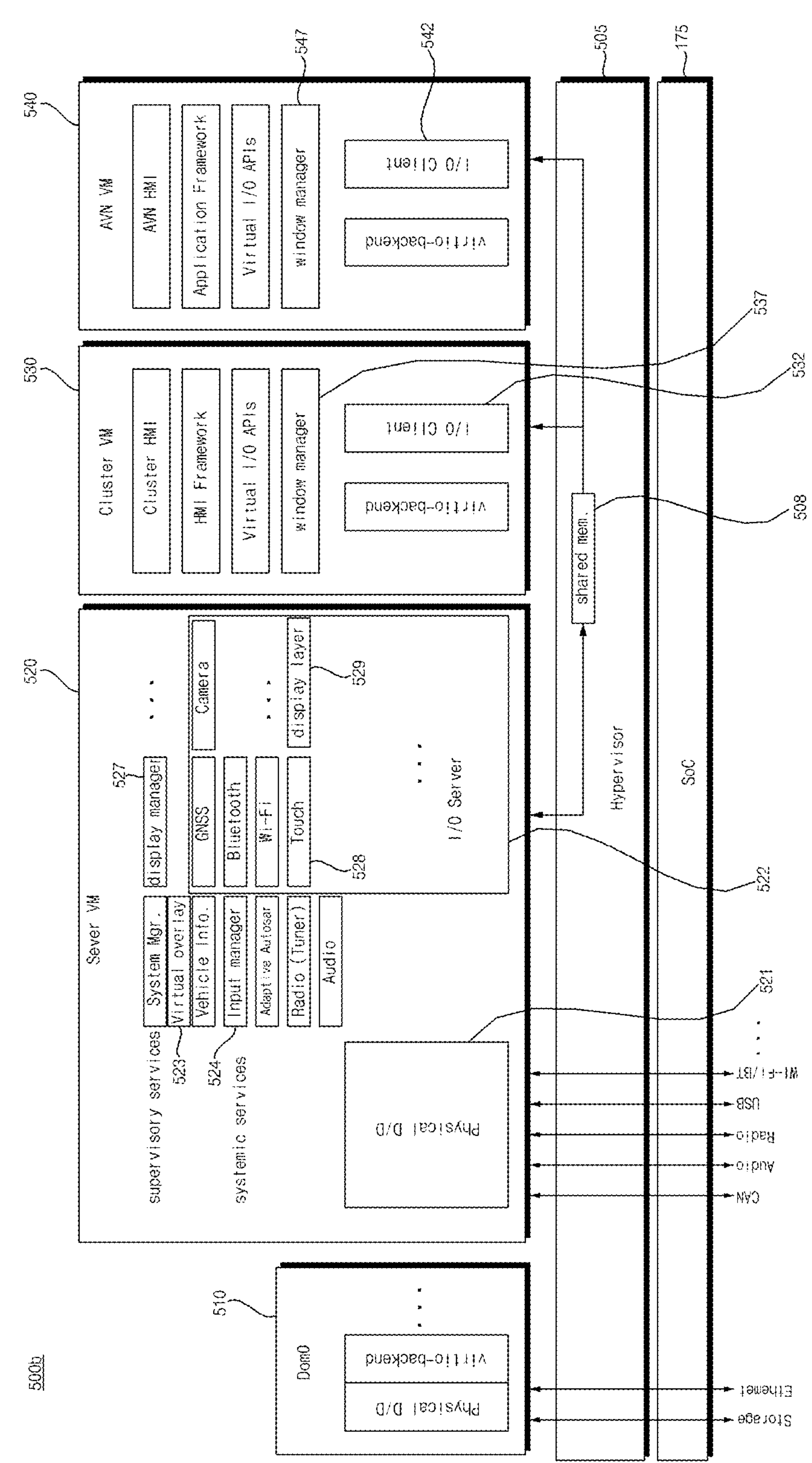
FIG. 6 is a diagram illustrating another example of the system driven in the signal processing device.

FIG. 6 is a diagram illustrating another example of the system driven in the signal processing device.

Referring to the figure, in the system 500*b* driven by the processor 175 in the signal processing device 170, the processor 175 in the signal processing device 170 can execute the first to third virtual machines 520 to 540 on the hypervisor 505 in the processor 175, and the first virtual machine 520 in the processor 175 can be configured to set the shared memory 508 based on the hypervisor 505 for transmission of data to the second and third virtual machines 530 and 540.

For example, information regarding touch input can be illustrated as the data. Consequently, the information regarding touch input can be transmitted to the second virtual machine 530 or the third virtual machine 540. Eventually, the touch input to the first display 180*a* or the second display 180*b* can be rapidly and accurately processed. In addition, the touch input can be rapidly and accurately processed even though the number of virtual machines that are driven is increased.

As another example, image data can be illustrated as the data. Consequently, an image can be displayed on the first display 180*a* or the second display 180*b*.

In some implementations, in response to the same image data being shared in the shared memory 508, the plurality of displays 180*a* and 180*b* in the vehicle can be configured to display the same data in a synchronized state.

As another example, CAN communication data, audio data, radio data, USB data, wireless communication data, or position information data can be illustrated as the data.

Consequently, information regarding the data can be displayed on the first display 180*a* or the second display 180*b*.

In some implementations, the legacy virtual machine 510 can transmit memory data from the memory 140 or Ethernet data by Ethernet communication to the second and third virtual machines 530 and 540 using the shared memory 508 based on the hypervisor 505. Consequently, information corresponding to the memory data or the Ethernet data can be displayed on the first display 180*a* or the second display 180*b*.

In some implementations, the first virtual machine 520 in the system 500*b* of FIG. 6 can include a display manager 527, a display layer server 529, a virtual overlay creator 523, an input manager 524, and a touch server 528, similarly to the first virtual machine 520 in the system 500 of FIG. 5.

In some implementations, the input and output server interface 522 in the first virtual machine 520 in the system 500*b* of FIG. 6 can include a display layer server 529 and a touch server 528.

The operation of the display manager 527, the display layer server 529, the input manager 524, the virtual overlay creator 523, and the touch server 528 is the same to FIG. 5, and therefore a description thereof will be omitted.

In some implementations, the first virtual machine 520 of FIG. 6 can further include a system manager for overall system control, a vehicle information manager for vehicle information management, an audio manager for audio control, and a radio manager for radio control.

In some implementations, the input and output server interface 522 in the first virtual machine 520 in the system 500*b* of FIG. 6 can further include a GNSS server for GPS information input and output, a Bluetooth server for Bluetooth input and output, a Wi-Fi server for Wi-Fi input and output, and a camera server for camera data input and output.

Figure 7:
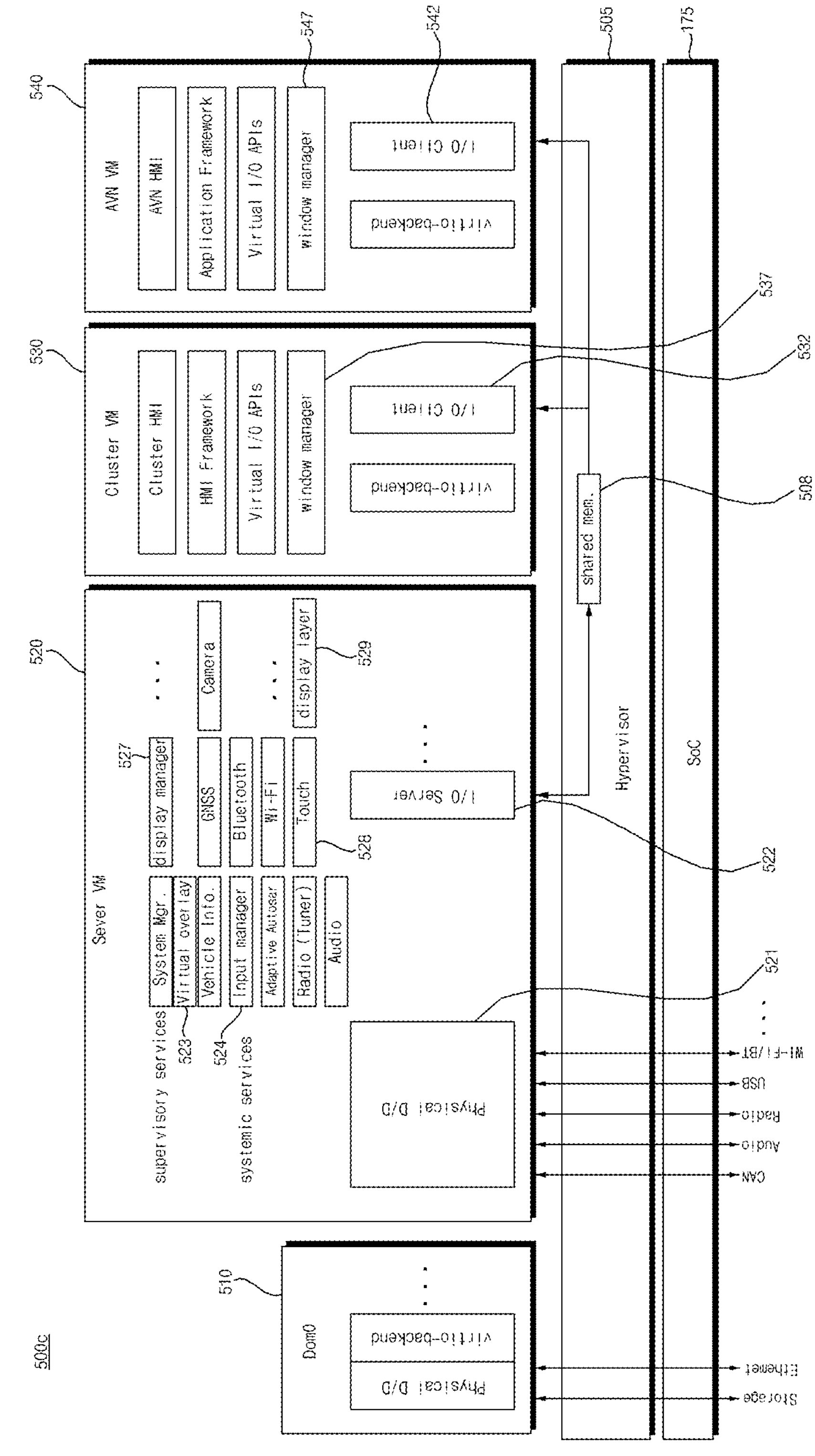
FIG. 7 is a diagram illustrating another example of the system driven in the signal processing device.

FIG. 7 is a diagram illustrating another example of the system driven in the signal processing device.

Referring to the figure, the system 500*c* driven by the processor 175 in the signal processing device of FIG. 7 is similar to the system 500*b* of FIG. 6.

For example, the processor 175 of FIG. 7 can execute the first to third virtual machines 520 to 540 on the hypervisor 505 in the processor 175.

As depicted in FIG. 7, the display layer server 529 and the touch server 528 can be provided and executed in the first virtual machine 520 outside the input and output server interface 522.

In addition, the GNSS server for GPS information input and output, the Bluetooth server for Bluetooth input and output, the Wi-Fi server for Wi-Fi input and output, and the camera server for camera data input and output can be provided and executed in the first virtual machine 520 outside the input and output server interface 522.

For example, the display manager 527, the display layer server 529, the virtual overlay creator 523, the input manager 524, and the touch server 528 can be provided and executed in the first virtual machine 520.

The operation of the display manager 527, the display layer server 529, the virtual overlay creator 523, the input manager 524, and the touch server 528 can be the same to FIG. 5, and therefore a description thereof will be omitted.

Figure 8:
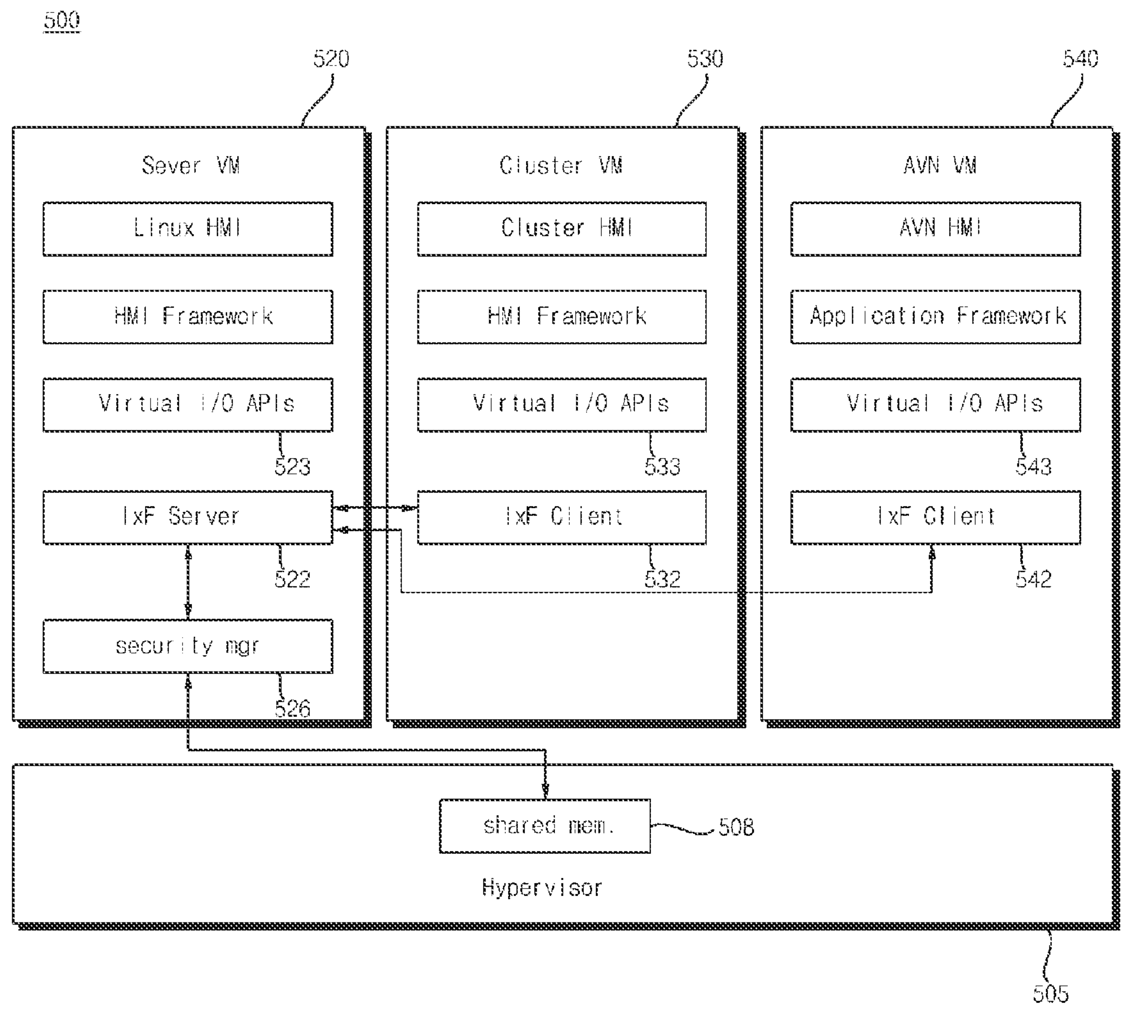
FIGS. 8, 9A, and 9B are diagrams referred to in the description of FIG. 5.
Figure 9A:
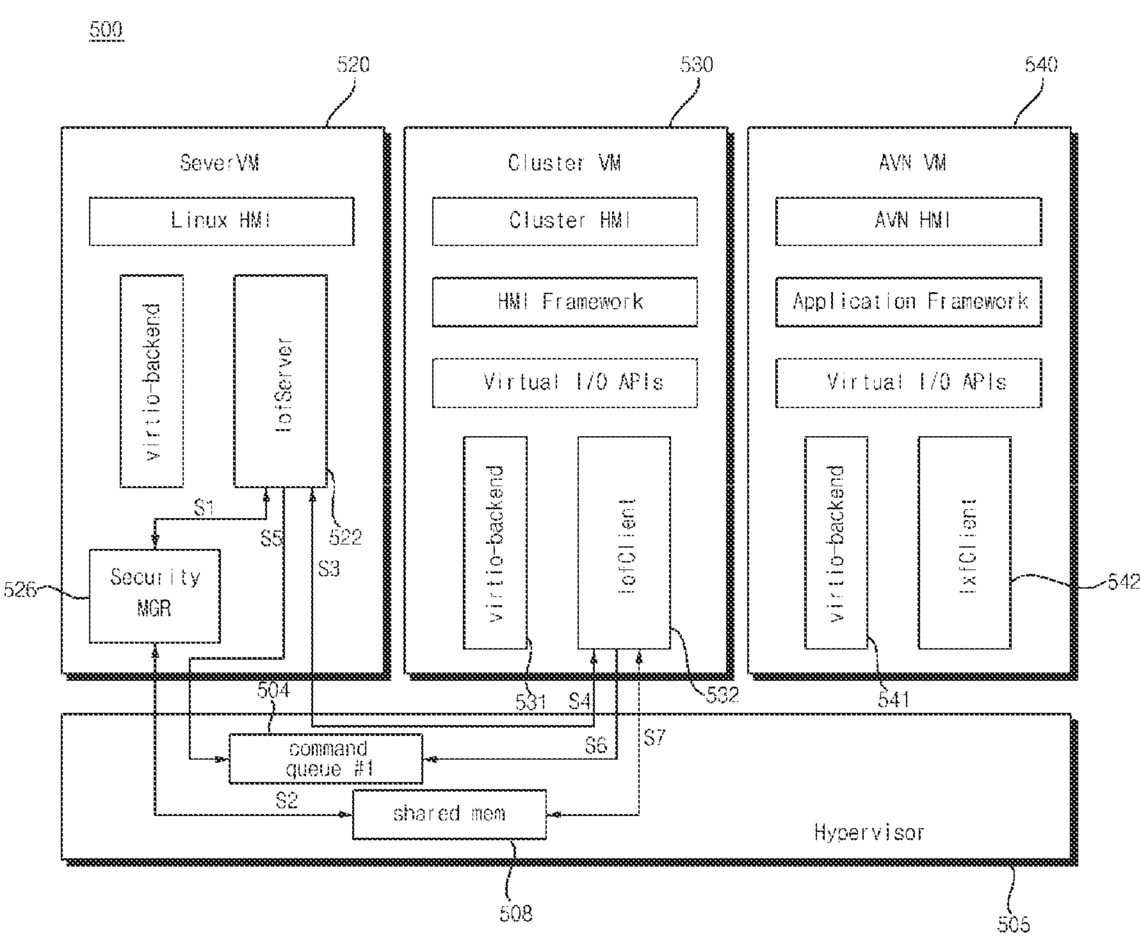
Figure 9B:
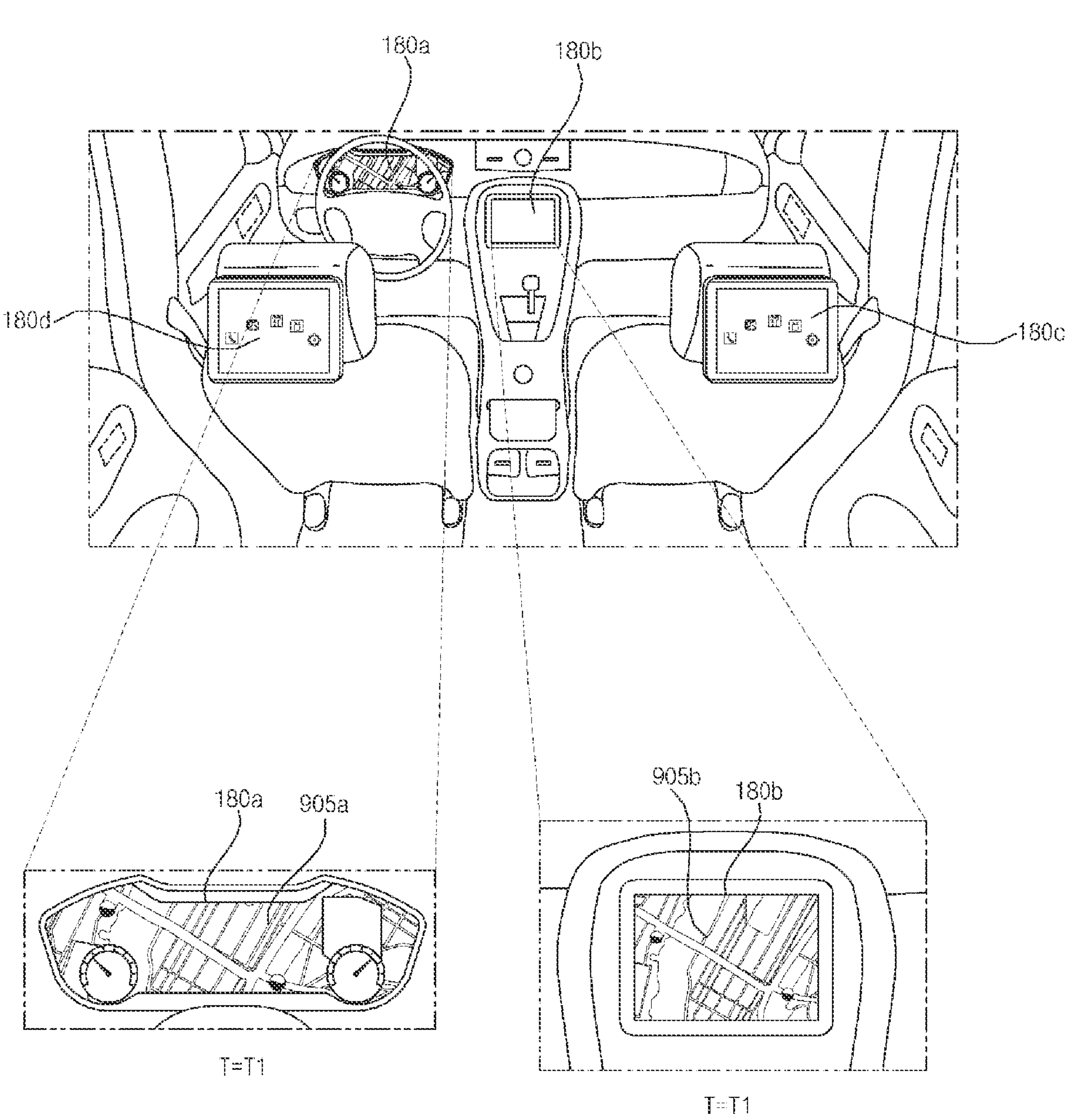

FIGS. 8, 9A, and 9B are diagrams referred to in the description of FIG. 5.

First, FIG. 8 illustrates that the first to third virtual machines 520 to 540 can be executed on the hypervisor 505 in the processor 175 of the system 500 and that the first virtual machine 520 in the processor 175 can be configured to set the shared memory 508 based on the hypervisor 505 to transmit the same data to the second virtual machine 530 and the third virtual machine 540.

Consequently, the first display 180*a* and the second display 180*b* in the vehicle can be configured to display the same images in a synchronized state.

In some implementations, high-speed data communication can be performed between the plurality of virtual machines. Furthermore, high-speed data communication can be performed even though the plurality of virtual machines is driven by different operating systems.

In some implementations, the first virtual machine 520 in the processor 175 may not allocate memories corresponding in number to the virtual machines but can use a single shared memory 508, not memory allocation in response to transmitting the data processed by the first virtual machine 520 to another virtual machine. Consequently, 1:N data communication using the shared memory 508, not 1:1 data communication, can be performed between the virtual machines.

In some implementations, the first virtual machine 520 in the processor 175 can include an input and output server interface 522 and a security manager 526.

In some implementations, the second virtual machine 530 and the third virtual machine 540 can include input and output client interfaces 532 and 542, respectively. Consequently, high-speed data communication between the plurality of virtual machines can be performed using the input and output server interface 522 and the input and output client interfaces 532 and 542.

The input and output server interface 522 in the first virtual machine 520 can receive requests for transmission of the same data from the input and output client interfaces 532 and 542 in the second virtual machine 530 and the third virtual machine 540, and can transmit shared data to the shared memory 508 through the security manager 526 based thereon.

FIG. 9A is a diagram illustrating transmission of shared data in more detail.

Referring to the figure, to transmit shared data, the input and output server interface 522 in the first virtual machine 520 can transmit a request for allocation of the shared memory 508 to the security manager 526 (S1).

Subsequently, the security manager 526 can allocate the shared memory 508 using the hypervisor 505 (S2), and can write shared data in the shared memory 508.

In some implementations, the input and output client interfaces 532 and 542 can transmit a request for connection to the input and output server interface 522 after allocation of the shared memory 508 (S3).

In some implementations, the input and output server interface 522 transmits information regarding the shared memory 508 including key data to the input and output client interfaces 532 and 542 after allocation of the shared memory 508 (S4). In some implementations, the key data can be private key data.

In some implementations, the first virtual machine 520 in the processor 175 can transmit information regarding the shared memory 508 to the second virtual machine 530 and the third virtual machine 540 after setting of the shared memory 508.

Subsequently, the input and output server interface 522 in the first virtual machine 520 can be configured to generate a command or a command queue for event processing, other than data, to control distributed processing between the virtual machines (S5).

The figure illustrates that a command queue is generated in a command queue buffer 504 in the hypervisor 505 under control of the input and output server interface 522. However, the present disclosure is not limited thereto, and the command queue can be generated in the first virtual machine 520, not the hypervisor 505, under control of the input and output server interface 522.

Subsequently, the input and output client interfaces 532 and 542 can access the command queue buffer 504 to receive the generated command queue or information regarding the command queue (S6).

For example, in response to the commands transmitted to the input and output client interfaces 532 and 542 being the same, the generated command queues can be the same.

As another example, in response to the commands transmitted to the input and output client interfaces 532 and 542 being different from each other, different command queues can be transmitted to the input and output client interfaces 532 and 542.

Subsequently, the input and output client interfaces 532 and 542 can access the shared memory 508 based on the received key data (S5), and can copy or read the shared data from the shared memory 508 (S7).

Particularly, when the input and output client interfaces 532 and 542 receive the same shared data, input and output client interfaces 532 and 542 can access the shared memory 508 based on the same command queues and the same key data (S5), and can copy or read the shared data from the shared memory 508.

Consequently, the second virtual machine 530 and the third virtual machine 540 can access the shared memory 508, and can eventually share the shared data.

For example, in the case in which the shared data are image data, the second virtual machine 530 and the third virtual machine 540 can share the image data, and eventually the plurality of displays 180*a* and 180*b* in the vehicle can be configured to display the same shared images in a synchronized state.

FIG. 9B illustrates that, by the system 500 of FIG. 9A, the second virtual machine 530 can control the first display 180*a* to display image data received through the shared memory 508, and the third virtual machine 540 can control the second display 180*b* to display image data received through the shared memory 508.

FIG. 9B illustrates that an image 905*a* displayed on the first display 180*a* and an image 905*b* displayed on the second display 180*b* can be synchronized, whereby the same images 905*a* and 905*b* are displayed at the time of Ti.

For example, image data processed by the first virtual machine 520 in the processor 175 are transmitted to the second virtual machine 530 and the third virtual machine 540 through the shared memory 508, and the first image 905*a* displayed on the first display 180*a* and the second image 905*b* displayed on the second display 180*b* based on the image data can be the same. Consequently, the plurality of displays 180*a* and 180*b* in the vehicle can be configured to display the same images in a synchronized state.

Figure 10:
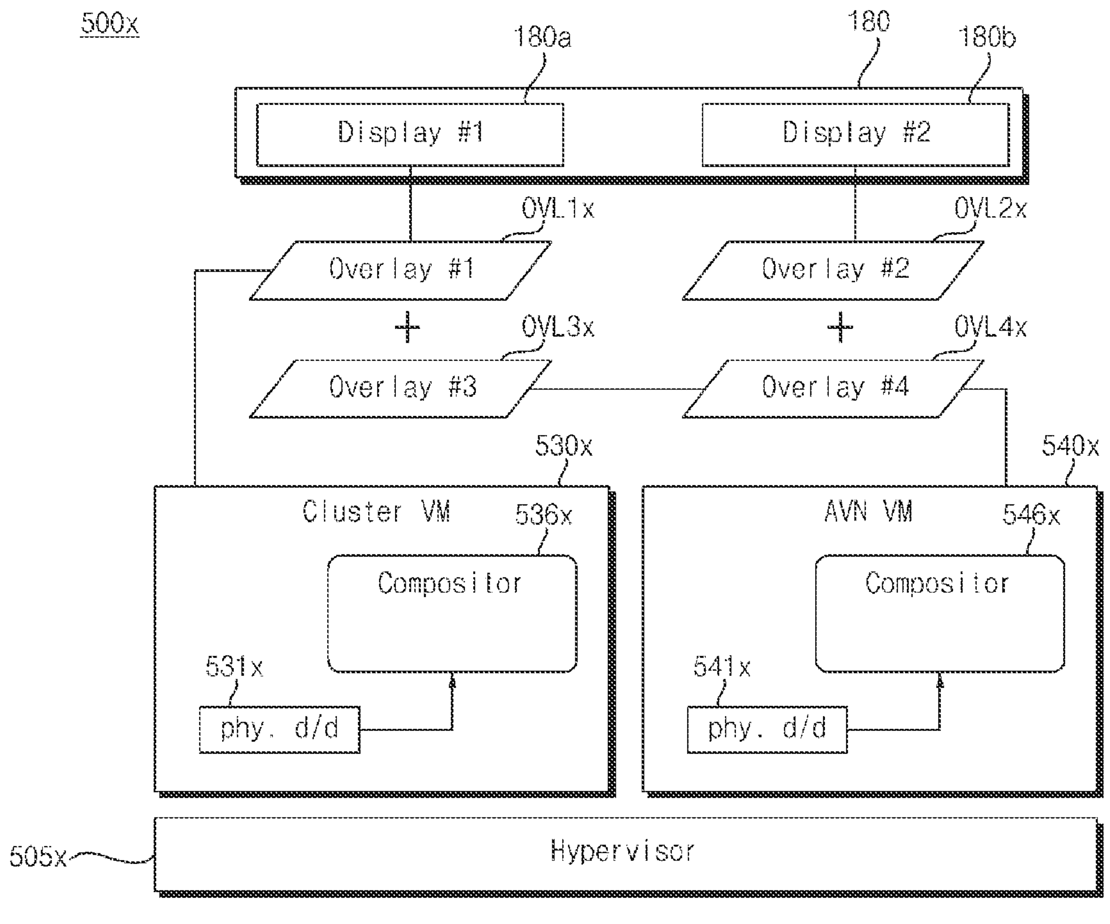
FIG. 10 is a diagram describing that a signal processing device displays an overlay.

FIG. 10 is a diagram describing that a signal processing device displays an overlay.

Referring to the figure, a system 500*x* driven in the signal processing device 170 can be configured to control the first display 180*a* to display a first overlay OVL1*x* and a third overlay OVL3*x*, and can be configured to control the second display 180*b* to display a second overlay OVL2*x* and a fourth overlay OVL4*x*.

Specifically, the first overlay OVL1*x* and the third overlay OVL3*x* can be displayed on the first display 180*a* in the state in which the first overlay is displayed on the third overlay, and the second overlay OVL2*x* and the fourth overlay OVL4*x* can be displayed on the second display 180*b* in the state in which the second overlay is displayed on the fourth overlay.

In some implementations, a cluster virtual machine 530*x* can dispose the first overlay OVL1*x* on the third overlay OVL3*x*, and an AVN virtual machine 540*x* can dispose the second overlay OVL2*x* on the fourth overlay OVL4*x*.

In the system 500*x* of the figure, however, change of the layer sequence, such as disposition of the third overlay OVL3*x* on the first overlay OVL1*x*, may be difficult during run time in the state in which the first overlay OVL1*x* is displayed on the third overlay OVL3*x*.

Similarly, change of the layer sequence, such as disposition of the fourth overlay OVL4*x* on the second overlay OVL2*x*, may be difficult during run time in the state in which the second overlay OVL2*x* is displayed on the fourth overlay OVL4*x*.

In some implementations, when the virtual machines that control the displays perform setting of the overlays, as in the system 500*x* of the figure, all requirements of a user interface may not be satisfied, since the number of overlays that can be displayed may be limited.

Furthermore, when a separate display and a virtual machine corresponding to the separate display are added, the signal processing device 170 can also perform signal processing of overlays in the added virtual machine, and therefore processing load of the signal processing device can be increased.

The present disclosure proposes a scheme capable of changing the display sequence and display area of a plurality of overlays. This will be described with reference to FIG. 11 and subsequent figures.

Figure 11:
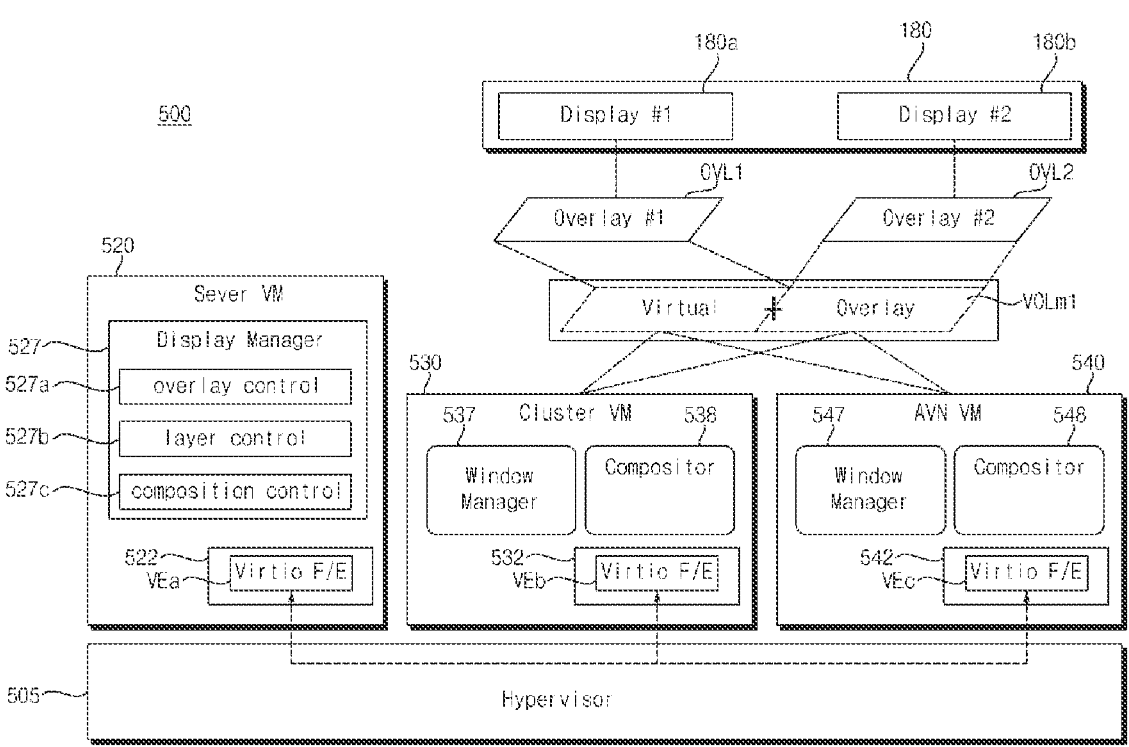
FIG. 11 is a diagram describing an example of display of overlays in the system driven in the signal processing device.

FIG. 11 is a diagram describing an example of display of overlays in the system driven in the signal processing device.

Referring to the figure, the processor 175 in the signal processing device 170 can drive the hypervisor 505, and execute the first virtual machine 520, the second virtual machine 530, and the third virtual machine 540 on the hypervisor 505.

In some implementations, the first virtual machine 520 can change the layer sequence or display area of a virtual overlay, and transmit the changed virtual overlay or information regarding the changed virtual overlay to the second virtual machine 530 or the third virtual machine 540 such that the changed virtual overlay is displayed on the first display 180*a* or the second display 180*b*.

Consequently, the display sequence and display area of the plurality of overlays can be changed. In addition, the display sequence and display area of the plurality of overlays can be changed even though the number of virtual machines that are driven is increased.

In some implementations, the second virtual machine 530 or the third virtual machine 540 can combine the changed virtual overlay with each physical overlay, and can be configured to control the first display 180*a* or the second display 180*b* to display the composite overlay related to the combined overlay. Consequently, the composite overlay can be displayed on the display.

In some implementations, a first virtual machine 520 can be configured to generate a virtual overlay and transmit the virtual overlay to a second virtual machine 530 or a third virtual machine 540, and the second virtual machine 530 or the third virtual machine 540 can be configured to change the layer sequence or display area of the virtual overlay in response to the virtual overlay being displayed on the first display 180*a* or the second display 180*b*.

Consequently, the display sequence and display area of the plurality of overlays can be changed. In addition, the display sequence and display area of the plurality of overlays can be changed even though the number of virtual machines that are driven is increased.

In some implementations, the first virtual machine 520 can include a display manager 527 including an overlay controller 527*a* configured to control an overlay, a layer controller 527*b* configured to control a layer, and a composition controller 527*c* configured to control the construction or sequence of the layer.

In some implementations, the input and output server interface 522 in the first virtual machine 520 can include a front interface VEa configured to transmit a command for constructing the virtual overlay to the second virtual machine 530 and the third virtual machine 540 or to receive a command for constructing the virtual overlay from the second virtual machine 530 and the third virtual machine 540.

In some implementations, the input and output client interface 532 in the second virtual machine 530 can include a front interface VEb configured to receive a command for constructing the virtual overlay from the first virtual machine 520 or to transmit a command for constructing the virtual overlay to the first virtual machine 520.

In some implementations, the second virtual machine 530 can include a window manager 537 configured to control a window of an image in which an overlay will be generated or displayed and a compositor 538 configured to combine overlays or windows generated by the second virtual machine 530.

In some implementations, the input and output client interface 542 in the third virtual machine 540 can include a front interface VEc configured to receive a command for constructing the virtual overlay from the first virtual machine 520 or to transmit a command for constructing the virtual overlay to the first virtual machine 520.

In some implementations, the third virtual machine 540 can include a window manager 547 configured to control a window of an image in which an overlay will be generated or displayed and a compositor 548 configured to combine overlays or windows generated by the third virtual machine 540.

In some implementations, the first, second, and third virtual machines 520, 530, and 540 can transmit or receive virtual overlays using the shared memory 508, as described with reference to FIGS. 8, 9A, and 9B.

For example, the first virtual machine 520 can transmit a first virtual overlay generated by the first virtual machine 520 to the second virtual machine 530 and the third virtual machine 540 using the shared memory 508.

In some implementations, the first virtual machine 520 can receive virtual overlays generated by the second virtual machine 530 and the third virtual machine 540 using the shared memory 508.

In some implementations, the first virtual machine 520 can set the sequence of the plurality of virtual overlays, and can transmit information regarding the set sequence to the second virtual machine 530 and the third virtual machine 540 using the shared memory 508.

In some implementations, the first virtual machine 520 can change the layer sequence or display area of the plurality of virtual overlays, and can transmit sequence change information or area change information to the second virtual machine 530 and the third virtual machine 540 using the shared memory 508.

Consequently, the virtual overlays having changed sequence or changed display area can be displayed on the first display 180*a* or the second display 180*b*.

In particular, the sequence or display area can be changed using the first virtual machine 520, which is a server virtual machine, whereby the overlays displayed on the plurality of displays can be efficiently controlled.

In addition, all overlays can be controlled using the first virtual machine 520, which is a server virtual machine, whereby rapid and accurate display can be achieved.

In some implementations, each of the second virtual machine 530 and the third virtual machine 540 can generate a virtual overlay, and the first virtual machine 520 can set the overlay sequence or display area of the virtual overlays generated by the second virtual machine 530 and the third virtual machine 540. Consequently, the sequence or display area of the virtual overlays can be controlled.

In some implementations, the first virtual machine 520 can change the overlay sequence or display area of the virtual overlays generated by the second virtual machine 530 and the third virtual machine 540. Consequently, the sequence or display area of the virtual overlays can be changed.

In some implementations, the first virtual machine 520 can change the construction of the layer displayed on the first display 180*a* or the second display 180*b* during run time. Consequently, the construction of the layer displayed during run time can be changed. For example, the run time refers to time when a display is operated.

In some implementations, the first virtual machine 520 can generate a virtual overlay displayed on both the first display 180*a* and the second display 180*b*. Consequently, the generated virtual overlay can be easily displayed.

In some implementations, the first virtual machine 520 can move the generated virtual overlay and control the first display 180*a* or the second display 180*b* to display the virtual overlay. Consequently, the generated virtual overlay can be easily moved.

FIG. 11 illustrates that a virtual overlay OVL1 generated by the second virtual machine 530 can be displayed on a virtual overlay VOLm1 generated by the first virtual machine 520 and a composite overlay generated by the compositor 538 can be displayed on the first display 180*a*. Consequently, efficient resource management can be achieved.

In some implementations, FIG. 11 illustrates that a virtual overlay OVL2 generated by the third virtual machine 540 can be displayed on the virtual overlay VOLm1 generated by the first virtual machine 520 and a composite overlay generated by the compositor 548 can be displayed on the second display 180*b*. Consequently, efficient resource management can be achieved.

Figure 12:
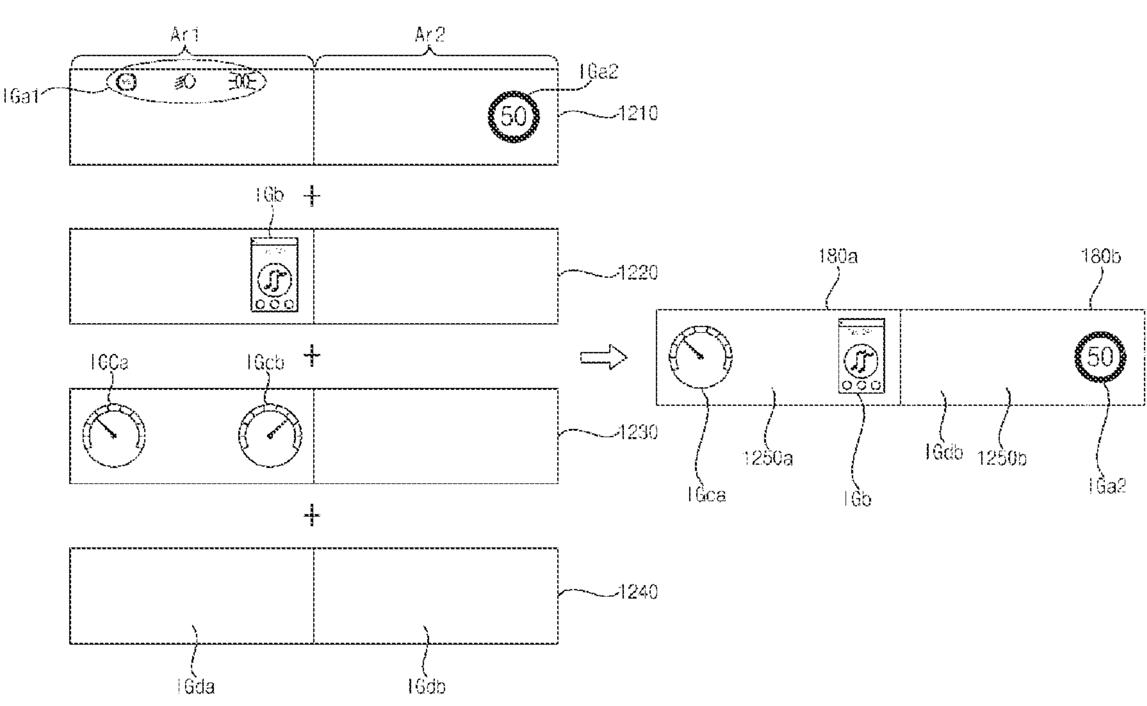
FIG. 12 is a diagram referred to in the description of FIG. 11.

FIG. 12 is a diagram referred to in the description of FIG. 11.

First, FIG. 12 illustrates a plurality of virtual overlays 1210, 1220, 1230, and 1240.

Referring to the figure, the first virtual machine 520 can receive vehicle information, and can generate a first virtual overlay 1210 including vehicle turn light information IGa1 and speed limit information IGa2.

The figure illustrates that the vehicle turn light information IGa1 is disposed in a first area Ar1 of the first virtual overlay 1210 and the speed limit information IGa2 is disposed in a second area Ar2 of the first virtual overlay 1210.

The second virtual machine 530 can generate a second virtual overlay 1220 including content information or contact information IGb.

The figure illustrates that the contact information IGb can be disposed in a first area Ar1 of the second virtual overlay 1220.

In some implementations, the first virtual machine 520 can receive wheel speed sensor data of the vehicle, and can generate a third virtual overlay 1230 including vehicle speed information IGca based thereon.

The figure illustrates that the vehicle speed information IGca can be disposed in a first area Ar1 of the third virtual overlay 1230.

In some implementations, the third virtual machine 540 can generate a fourth virtual overlay 1240 including map information IGda and IGdb.

The figure illustrates that the first map information IGda can be disposed in a first area Ar1 of the fourth virtual overlay 1240 and the second map information IGdb can be disposed in a second area Ar2 of the fourth virtual overlay 1240.

In some implementations, the first virtual machine 520 can be configured to control the first display 180*a* or the second display 180*b* to display at least one of the plurality of virtual overlays shown in the figure. Consequently, various kinds of information can be displayed through the display.

For example, the first virtual machine 520 can be configured to display the vehicle speed information IGca and the contact information IGb on the first display 180*a* and the map information IGda and IGdb and display speed limit information IGa2 on the second display 180*b*, as shown in the figure.

In some implementations, the first virtual machine 520 can change the layer sequence or display area of the first to fourth virtual overlays 1210, 1220, 1230, and 1240, and can be configured to control the first display 180*a* or the second display 180*b* to display the changed virtual overlays.

Consequently, the display sequence and display area of the plurality of overlays can be changed. In addition, the display sequence and display area of the plurality of overlays can be changed even though the number of virtual machines that are driven is increased.

Similarly, the first virtual machine 520 can generate a first virtual overlay including vehicle speed information IGca, the second virtual machine 530 can generate a second virtual overlay including content information or contact information IGb, the third virtual machine 540 can generate a third virtual overlay including map information IGda and IGdb, and the first virtual machine 520 can be configured to control the first display 180*a* or the second display 180*b* to display at least one of the first, second, or third virtual overlays. Consequently, various kinds of information can be displayed through the display.

In some implementations, the first virtual machine 520 can receive and process wheel speed sensor data of the vehicle, and can transmit an overlay indicating the processed wheel speed sensor data or speed information corresponding to the processed wheel speed sensor data to at least one of the second virtual machine 530 or the third virtual machine 540. Consequently, at least one virtual machine can share the wheel speed sensor data of the vehicle. In addition, the vehicle speed information can be displayed through the display.

Figure 13:
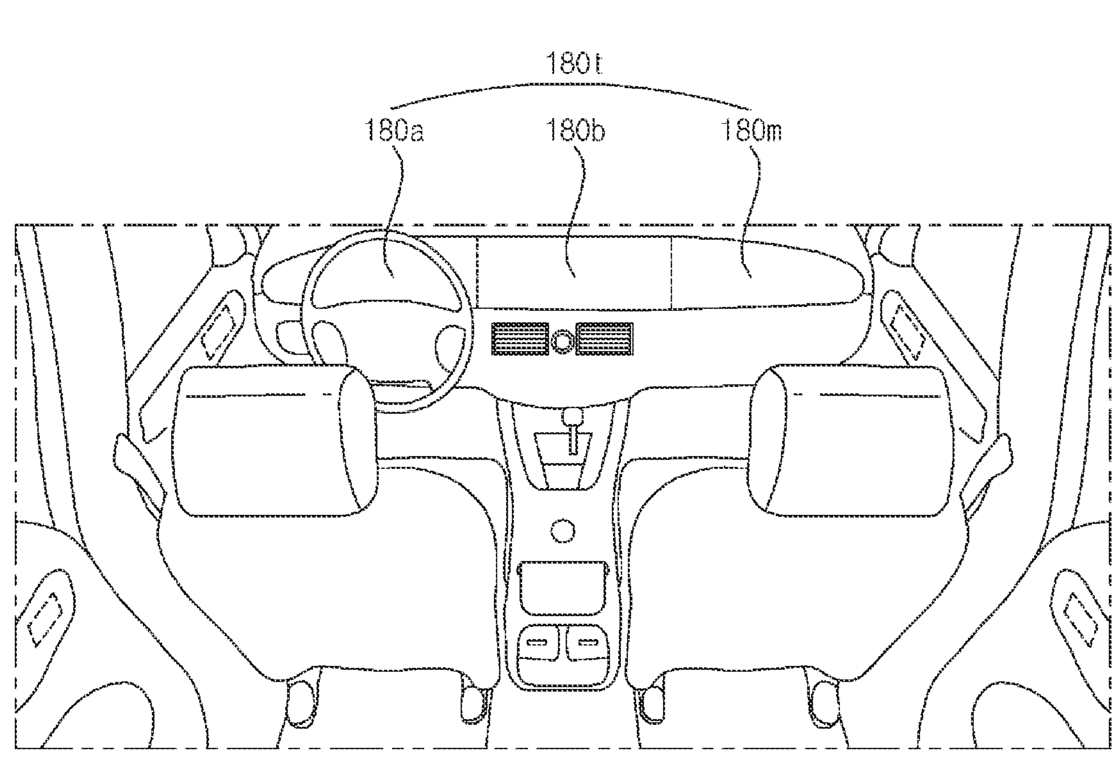
FIG. 13 is a diagram illustrating another example of an external appearance of a display apparatus for vehicle.

FIG. 13 is a diagram illustrating another example of an external appearance of a display apparatus for vehicle.

Referring to the figure, the display apparatus 100 for vehicle can include a plurality of displays 180*a*, 180*b*, and 180*m* extending from a driver's seat to a passenger seat and a signal processing device 170 configured to perform signal processing to display images and information on the plurality of displays 180*a*, 180*b*, and 180*m*.

The plurality of displays 180*a*, 180*b*, and 180*m* can be disposed in a single frame.

For example, the plurality of displays 180*a*, 180*b*, and 180*m* can be implemented as a single seamless display 170*t*.

Among the plurality of displays 180*a*, 180*b*, and 180*m*, the first display 180*a* can be a cluster display, the second display 180*b* can be an AVN display, and the third display 180*m* can be a passenger seat display.

The signal processing device 170 can have a processor 175 provided therein, and can execute first to fourth virtual machines 520 to 550 on a hypervisor 505 in the processor 175.

The second virtual machine 530 can be operated for the first display 180*a*, the third virtual machine 540 can be operated for the second display 180*b*, and the fourth virtual machine 550 can be operated for the third display 180*m*.

FIGS. 14, 15, 16, 17, 18A, 18B, 18C, 18D, 18E, and 19 are diagrams referred to in the description of FIG. 13.

Figure 14:
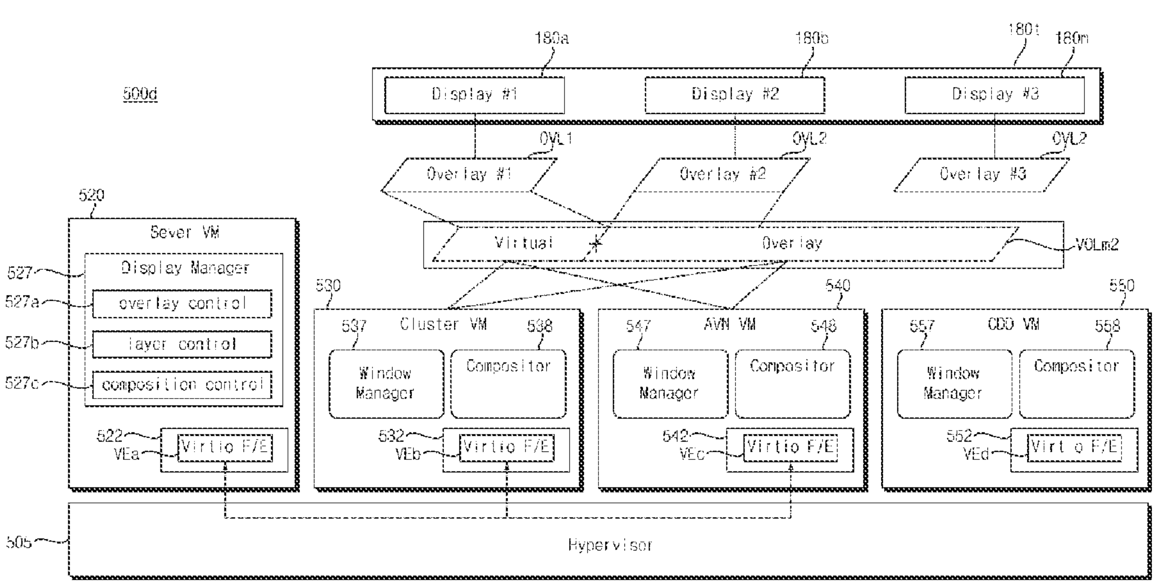
FIGS. 14, 15, 16, 17, 18A, 18B, 18C, 18D, 18E, and 19 are diagrams referred to in the description of FIG. 13.

FIG. 14 is a diagram illustrating an example of a system 500*d* driven in the signal processing device for the display apparatus for vehicle of FIG. 13.

Referring to the figure, in the system 500*d* of FIG. 14, the processor 175 in the signal processing device 170 can drive the hypervisor 505, and execute the first virtual machine 520, the second virtual machine 530, the third virtual machine 540, and the fourth virtual machine 550 on the hypervisor 505.

In some implementations, the first virtual machine 520 can change the layer sequence or display area of a virtual overlay, and transmit the changed virtual overlay or information regarding the changed virtual overlay to the second virtual machine 530, the third virtual machine 540, or the fourth virtual machine 550 for displaying the changed virtual overlay on the first display 180*a*, the second display 180*b*, or the third display 180*m*.

Consequently, the display sequence and display area of the plurality of overlays can be changed. In addition, the display sequence and display area of the plurality of overlays can be changed even though the number of virtual machines that are driven is increased.

In some implementations, the second virtual machine 530, the third virtual machine 540, or the fourth virtual machine 550 can combine the changed virtual overlay with each physical overlay, and can be configured to control the first display 180*a*, the second display 180*b*, or the third display 180*m* to display the composite overlay related to the combined overlay. Consequently, the composite overlay can be displayed on the display.

In some implementations, a first virtual machine 520 can be configured to generate a virtual overlay and transmit the virtual overlay to a second virtual machine 530 or a third virtual machine 540, or a fourth virtual machine 550, and the second virtual machine 530, the third virtual machine 540, or the fourth virtual machine 550 can be configured to change the layer sequence or display area of the virtual overlay in response to the virtual overlay being displayed on the first display 180*a*, the second display 180*b*, or the third display 180*m*.

Consequently, the display sequence and display area of the plurality of overlays can be changed. In addition, the display sequence and display area of the plurality of overlays can be changed even though the number of virtual machines that are driven is increased.

In some implementations, the first virtual machine 520 can include a display manager 527 including an overlay controller 527*a* configured to control an overlay, a layer controller 527*b* configured to control a layer, and a composition controller 527*c* configured to control the construction or sequence of the layer.

In some implementations, an input and output server interface 522 in the first virtual machine 520 can include a front interface VEa configured to transmit a command for constructing the virtual overlay to the second virtual machine 530 and the third virtual machine 540 or to receive a command for constructing the virtual overlay from the second virtual machine 530 and the third virtual machine 540.

In some implementations, an input and output client interface 532 in the second virtual machine 530 can include a front interface VEb configured to receive a command for constructing the virtual overlay from the first virtual machine 520 or to transmit a command for constructing the virtual overlay to the first virtual machine 520.

In some implementations, the second virtual machine 530 can include a window manager 537 configured to control a window of an image in which an overlay will be generated or displayed and a compositor 538 configured to combine overlays or windows generated by the second virtual machine 530.

In some implementations, an input and output client interface 542 in the third virtual machine 540 can include a front interface VEc configured to receive a command for constructing the virtual overlay from the first virtual machine 520 or to transmit a command for constructing the virtual overlay to the first virtual machine 520.

In some implementations, the third virtual machine 540 can include a window manager 547 configured to control a window of an image in which an overlay will be generated or displayed and a compositor 548 configured to combine overlays or windows generated by the third virtual machine 540.

In some implementations, an input and output client interface 552 in the fourth virtual machine 550 can include a front interface VEd configured to receive a command for constructing the virtual overlay from the first virtual machine 520 or to transmit a command for constructing the virtual overlay to the first virtual machine 520.

In some implementations, the fourth virtual machine 550 can include a window manager 557 configured to control a window of an image in which an overlay will be generated or displayed and a compositor 558 configured to combine overlays or windows generated by the fourth virtual machine 550.

In some implementations, the first virtual machine 520 to the fourth virtual machine 550 can transmit or receive virtual overlays using the shared memory 508, as described with reference to FIGS. 8, 9A, and 9B.

In some implementations, the first virtual machine 520 can change the construction of the layer displayed on the first display 180*a*, the second display 180*b*, or the third display 180*m* during run time. Consequently, the construction of the layer displayed during run time can be changed.

In some implementations, the first virtual machine 520 can generate a virtual overlay VOLm2 displayed on all of the first display 180*a*, the second display 180*b*, and the third display 180*m*. Consequently, the generated virtual overlay can be easily displayed.

In some implementations, the first virtual machine 520 can move the generated virtual overlay, and control the first display 180*a*, the second display 180*b*, or the third display 180*m* to display the virtual overlay. Consequently, the generated virtual overlay can be easily moved.

FIG. 14 illustrates that a virtual overlay OVL1 generated by the second virtual machine 530 can be displayed on a virtual overlay VOLm2 generated by the first virtual machine 520 and a composite overlay generated by the compositor 538 can be displayed on the first display 180*a*. Consequently, efficient resource management can be achieved.

In some implementations, FIG. 14 illustrates that a virtual overlay OVL2 generated by the third virtual machine 540 can be displayed on the virtual overlay VOLm2 generated by the first virtual machine 520 and a composite overlay generated by the compositor 548 can be displayed on the second display 180*b*. Consequently, efficient resource management can be achieved.

In some implementations, FIG. 14 illustrates that a virtual overlay OVL3 generated by the fourth virtual machine 550 can be displayed on the virtual overlay VOLm2 generated by the first virtual machine 520 and a composite overlay generated by the compositor 558 can be displayed on the third display 180*m*. Consequently, efficient resource management can be achieved.

In some implementations, the overlay sequence or display area of the virtual overlays generated by the first virtual machine 520 to the fourth virtual machine 550 can be set. Consequently, the sequence and display area of the virtual overlays can be controlled. In addition, the display sequence and display area of the plurality of overlays can be changed even though the number of virtual machines that are driven is increased.

In some implementations, the second virtual machine 530 or the third virtual machine 540 can map the virtual overlay and the physical overlay one to one, and can be configured to control the first display 180*a* or the second display 180*b* to display a composite overlay generated by one-to-one mapping. Consequently, the composite overlay can be displayed on the display.

In some implementations, the second virtual machine 530 or the third virtual machine 540 can map the virtual overlay and the physical overlay one to n, and can be configured to control the first display 180*a* or the second display 180*b* to display a composite overlay generated by one-to-n mapping. Consequently, the composite overlay can be displayed on the display.

In some implementations, the first virtual machine 520 can be configured to delete the virtual overlay or add another virtual overlay. Consequently, the construction of the virtual overlay can be changed. This will be described with reference to FIG. 15 and subsequent figures.

Figure 15:
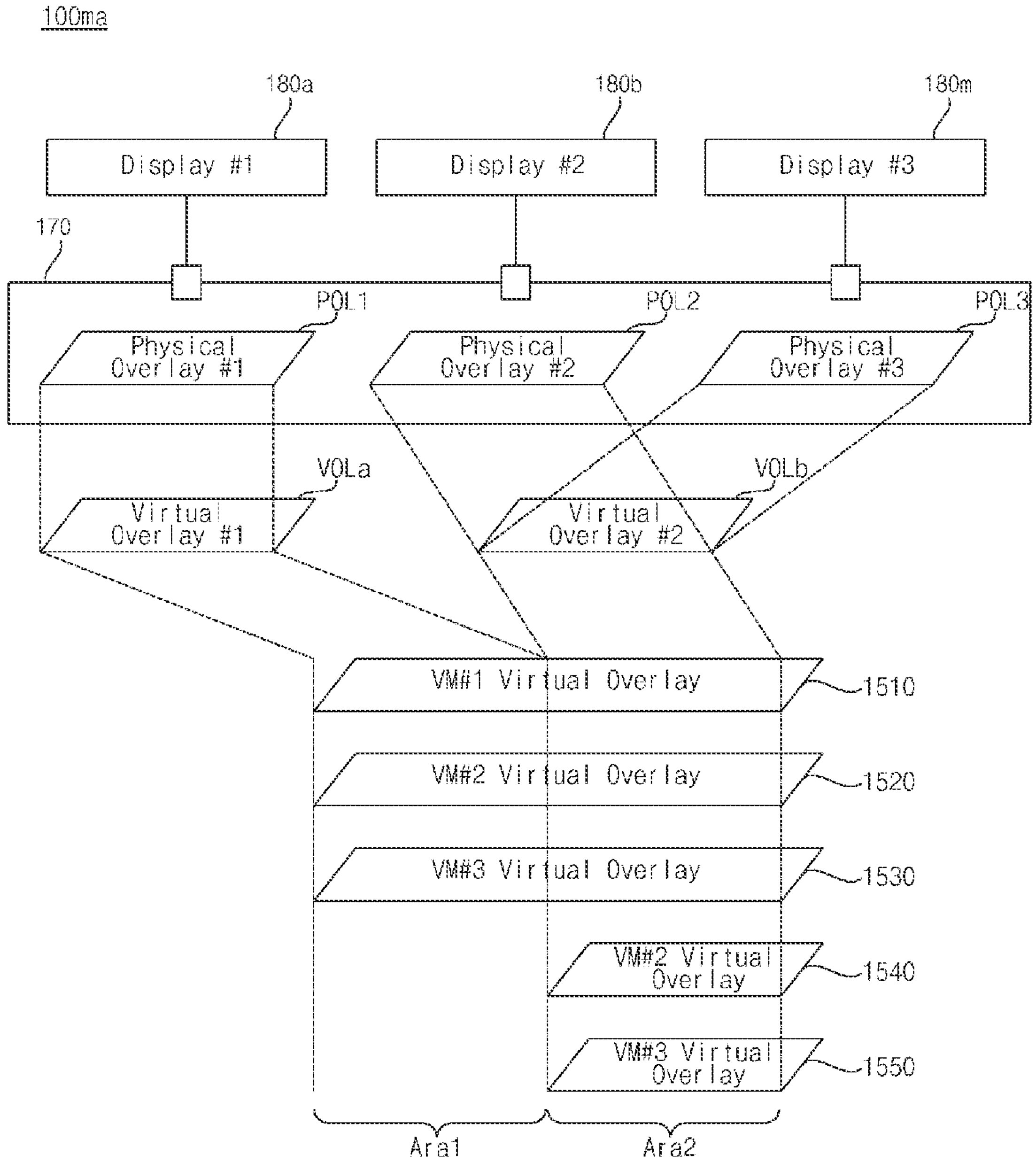

FIG. 15 is a diagram referred to in describing display of an image using a plurality of virtual overlays.

Referring to the figure, each of the first virtual machine 520, the second virtual machine 530, and the third virtual machine 540 can generate a first virtual overlay 1510, a second virtual overlay 1520, and a third virtual overlay 1530, each including a first area Ara1 and a second area Ara2.

In some implementations, each of the second virtual machine 530 and the third virtual machine 540 can generate a fourth virtual overlay 1540 and a fifth virtual overlay 1550, each including a second area Ara2.

The second virtual machine 530 can be configured to control the first display 180*a* to display a composite overlay generated by disposing a physical overlay POL1 on virtual overlays VOLa corresponding to the first area Ara1, among the first to fifth overlays 1510 to 1550.

The third virtual machine 540 can be configured to control the second display 180*b* to display a composite overlay generated by disposing a physical overlay POL2 on virtual overlays VOLb corresponding to the second area Ara2, among the first to fifth overlays 1510 to 1550.

The fourth virtual machine 550 can be configured to control the third display 180*m* to display a composite overlay generated by disposing a physical overlay POL3 on virtual overlays VOLb corresponding to the second area Ara2, among the first to fifth overlays 1510 to 1550.

Figure 16:
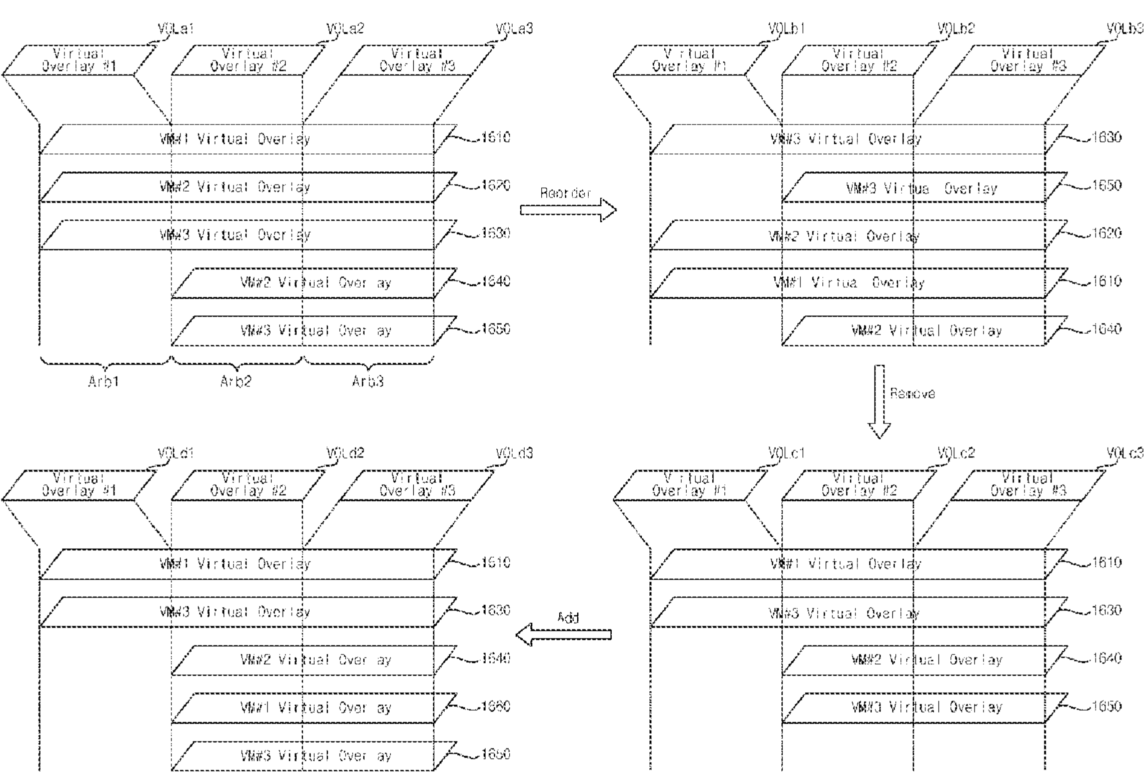

FIG. 16 is a diagram referred to in describing sequence change, deletion, and addition of a plurality of virtual overlays.

Referring to the figure, each of the first virtual machine 520, the second virtual machine 530, and the third virtual machine 540 can generate a first virtual overlay 1610, a second virtual overlay 1620, and a third virtual overlay 1630, each including a first area Arb1, a second area Arb2, and a third area Arb3.

In some implementations, each of the second virtual machine 530 and the third virtual machine 540 can generate a fourth virtual overlay 1640 and a fifth virtual overlay 1650, each including a second area Arb2 and a third area Arb3.

The second virtual machine 530 can be configured to control the first display 180*a* to display virtual overlays VOLa1 corresponding to the first area Arb1, among the first to fifth overlays 1610 to 1650.

The third virtual machine 540 can be configured to control the second display 180*b* to display virtual overlays VOLa2 corresponding to the second area Arb2, among the first to fifth overlays 1610 to 1650.

The fourth virtual machine 550 can be configured to control the third display 180*m* to display virtual overlays VOLa3 corresponding to the third area Arb3, among the first to fifth overlays 1610 to 1650.

In some implementations, the figure illustrates that the first virtual overlay 1610, the second virtual overlay 1620, the third virtual overlay 1630, the fourth virtual overlay 1640, and the fifth virtual overlay 1650 can be disposed from top to bottom.

The layer disposition sequence can be set by the first virtual machine 520.

In some implementations, the first virtual machine 520 can change the layer sequence of the plurality of virtual layers.

The figure illustrates that, as the result of changing the layer sequence, the third virtual overlay 1630, the fifth virtual overlay 1650, the second virtual overlay 1620, the first virtual overlay 1610, and the fourth virtual overlay 1640 can be disposed from top to bottom.

As described above, the layer sequence can be easily changed using the first virtual machine 520.

In some implementations, as shown in the figure, the first virtual machine 520 can delete the second virtual overlay 1620, which is one of the plurality of virtual layers 1610 to 1650.

In some implementations, as shown in the figure, the first virtual machine 520 can add a virtual overlay 1600 to the plurality of virtual layers 1610 and 1630 to 1650.

The figure illustrates that the virtual overlay 1600 can be added onto the fifth virtual overlay 1650.

As described above, the first virtual machine 520 can perform various operations, such as layer sequence change, deletion, or addition of virtual overlays. Consequently, overlay editing can be easily performed, and a user interface can be freely implemented.

FIGS. 17, 18A, 18B, 18C, 18D, and 18E illustrate various examples of virtual overlays for the first to third displays.

Figure 17:
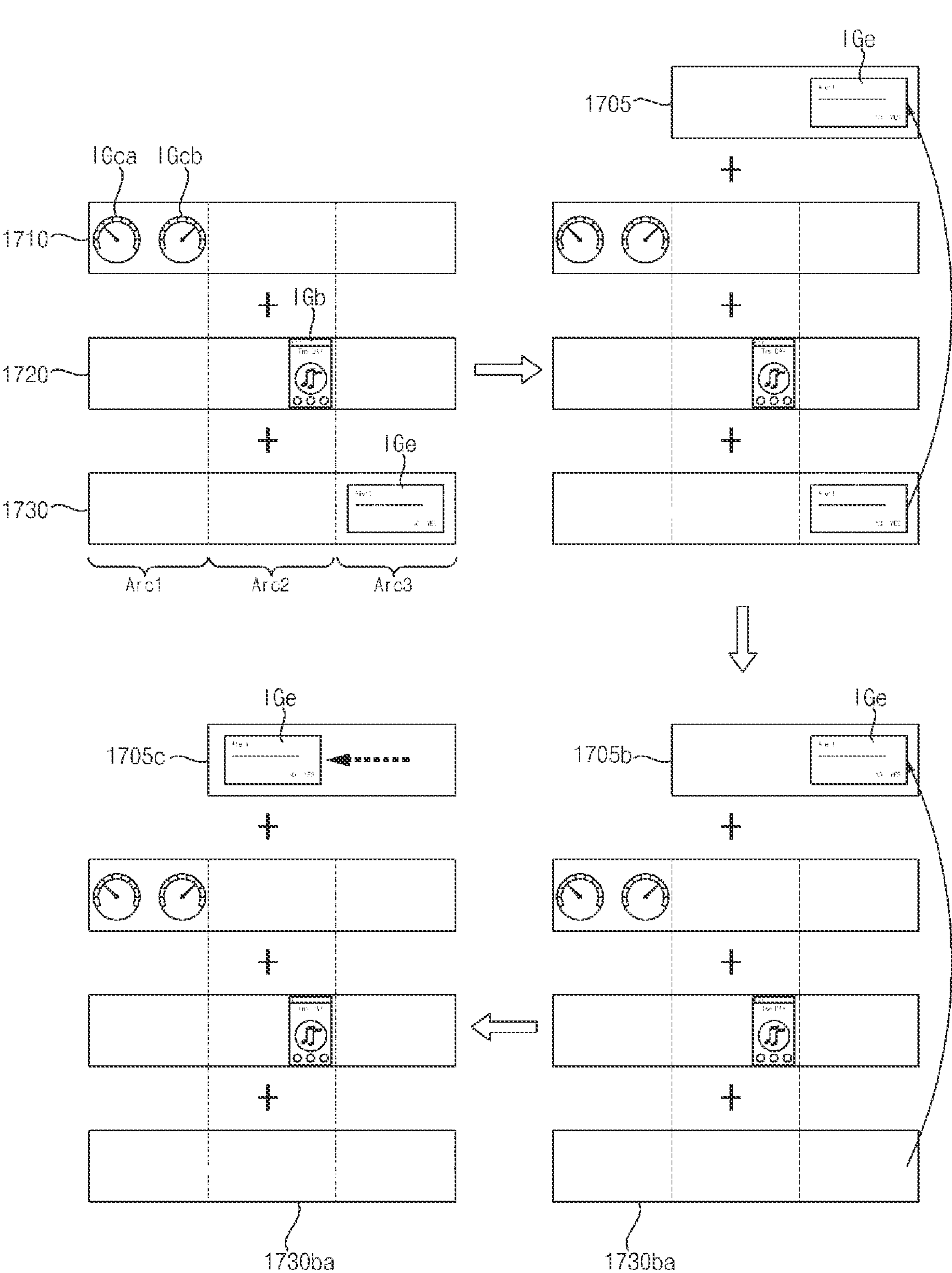

FIG. 17 illustrates that message information can be received during display of first to third virtual overlays 1710 to 1730, and a fourth virtual overlay 1705 including the message information can be displayed.

Referring to the figure, the first virtual machine 520 can generate a first virtual overlay 1710 including vehicle speed information IGca and IGcb in a first area Arc1, the second virtual machine 530 can generate a second virtual overlay 1720 including content information or contact information IGb in a second area Arc2, and the third virtual machine 540 can generate a third virtual overlay 1730 including map information in all areas Arc1, Arc2, and Arc3 and message information IGe in the third area Arc3.

In some implementations, in response to message information being received, the first virtual machine 520 can generate message information IGe and can be configured control a display to display the message information IGe.

For example, in response to message information being received, the first virtual machine 520 can generate message information IGe and can transmit the generated message information IGe to the third virtual machine 540.

In response thereto, the third virtual machine 540 can generate a fourth virtual overlay 1705 including the message information IGe in the third area Arc3.

In particular, the third virtual machine 540 can generate a third virtual overlay 1730 including map information in all areas Arc1, Arc2, and Arc3 and message information IGe in the third area Arc3.

The first virtual machine 520 can be configured to control the first to third displays 180*a*, 180*b*, and 180*m* to display at least one of the first to third virtual overlays. Consequently, various kinds of information can be displayed through the display. In addition, the display sequence and display area of the plurality of overlays can be changed even though the number of virtual machines that are driven is increased.

For example, the vehicle speed information IGca and IGcb can be displayed on the first display 180*a*, the contact information IGb can be displayed on the second display 180*b*, and the map information and the message information IGe can be displayed on the third display 180*m*.

In some implementations, as shown in the figure, the first virtual machine 520 can separately generate a fourth virtual overlay 1705 including the message information IGe in the third area Arc3.

The first virtual machine 520 can be configured to delete the message information IGe from the third virtual overlay 1730.

As shown in the figure, therefore, the third virtual overlay 1730 can include only the map information in all areas Arc1, Arc2, and Arc3 in the state in which the message information IGe is deleted therefrom.

In some implementations, the first virtual machine 520 can move the position of the message information IGe in the fourth virtual overlay 1705.

For example, as shown in the figure, the first virtual machine 520 can move the position of the message information IGe in a fourth virtual overlay 1705*c* from the third area Arc3 to the second area Arc2.

In response to the position of the message information IGe being moved from the third area Arc3 to the second area Arc2, as described above, the vehicle speed information IGca and IGcb can be displayed on the first display 180*a*, the contact information IGb and the message information IGe can be displayed on the second display 180*b*, and only the map information can be displayed on the third display 180*m*.

For example, in response to first virtual machine 520 assigning the priority to the message information IGe, which is one of the contact information IGb and the message information IGe, the message information IGe can be displayed on the contact information IGb, whereby the contact information IGb and the message information IGe can be displayed on the second display 180*b* in the state in which the message information IGe is displayed on the contact information IGb.

Figure 18A:
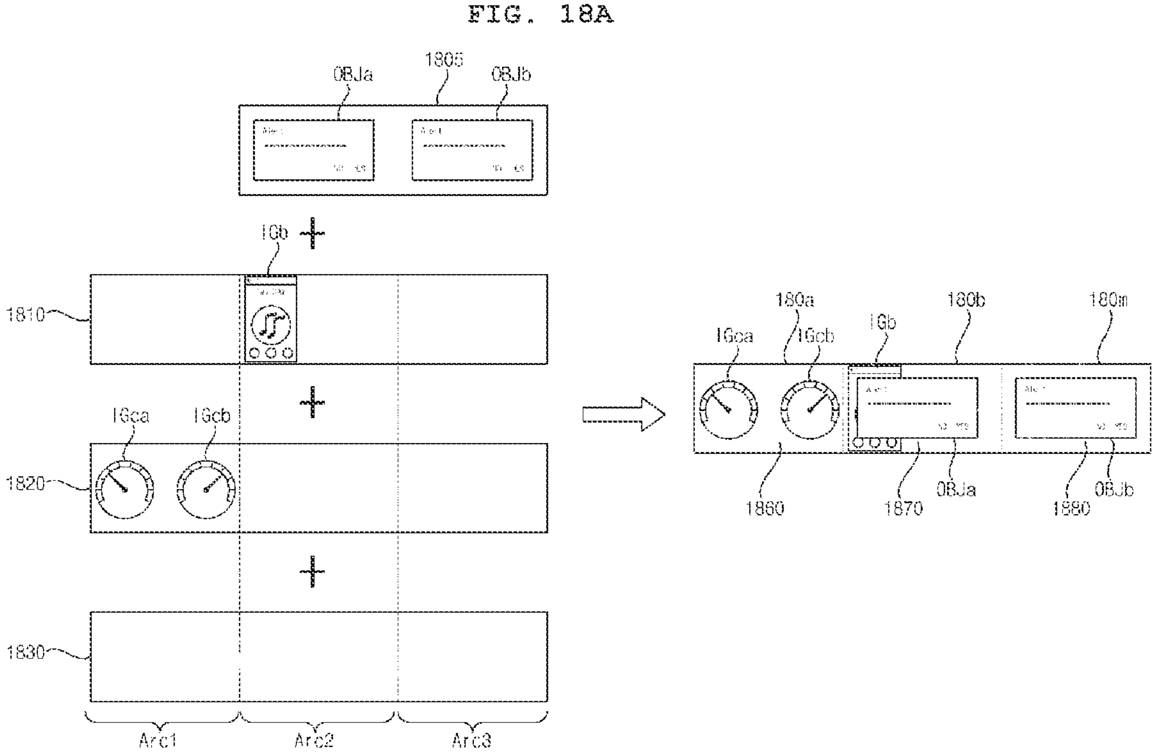

FIG. 18A illustrates that four virtual overlays 1805, 1810, 1820, and 1830 can be sequentially disposed from top to bottom.

Referring to the figure, the first virtual machine 520 can generate a fourth virtual overlay 1805 including first message information OBJa in a second area Arc2 and second message information OBJb in a third area Arc3, the second virtual machine 530 can generate a second virtual overlay 1810 including content information or contact information IGb in the second area Arc2, the first virtual machine 520 can generate a first virtual overlay 1820 including vehicle speed information IGca and IGcb in the first area Arc1, and the third virtual machine 540 can generate a third virtual overlay 1830 including map information in all areas Arc1, Arc2, and Arc3.

The first virtual machine 520 can sequentially dispose the fourth virtual overlay 1805, the second virtual overlay 1810, the first virtual overlay 1820, and the third virtual overlay 1830 from top to bottom.

Consequently, the fourth virtual overlay 1805 can be disposed at the uppermost side.

As shown in the figure, the vehicle speed information IGca and IGcb can be displayed on the first display 180*a* in a state of being displayed on map information 1860, the contact information IGb can be displayed on the second display 180*b* in a state of being displayed on map information 1870, the first message information OBJa can be displayed on the second display 180*b* in a state of being displayed on the contact information IGb, and the second message information OBJb can be displayed on the third display 180*m* in a state of being displayed on map information 1880.

For example, in response to message information being received, the first virtual machine 520 can be configured to display the first message information OBJa on the contact information IGb in the second display 180*b*. Consequently, various kinds of information can be displayed through the display.

In some implementations, in response to message information being received, the first virtual machine 520 can be configured to control the third display 180*m* to display the second message information OBJb on the map information 1880. Consequently, various kinds of information can be displayed through the display.

In some implementations, the first virtual machine 520 can move an object on the plurality of virtual overlays, and can be configured to control at least one of the plurality of displays to display the moved object. Consequently, the object can be moved and displayed. This will be described with reference to FIGS. 18B and 18C.

Figure 18B:
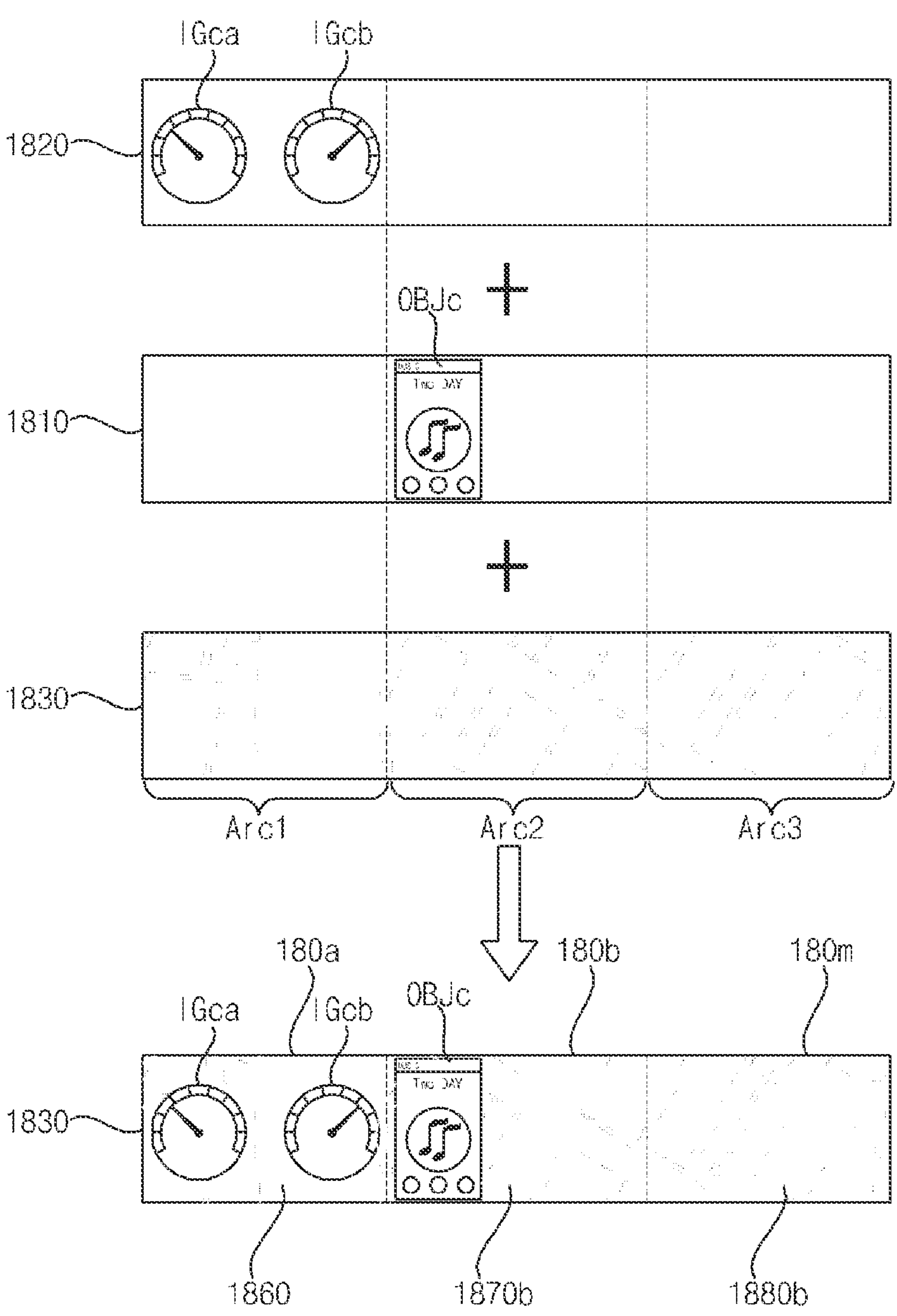

FIG. 18B illustrates that a first virtual overlay 1820, a second virtual overlay 1810, and a third virtual overlay 1830 can be sequentially disposed from top to bottom.

The first virtual machine 520 can sequentially dispose a first virtual overlay 1820 including vehicle speed information IGca and IGcb in a first area Arc1, a second virtual overlay 1810 including contact information OBJc in a second area Arc2, and a third virtual overlay 1830 including map information in all areas Arc1, Arc2, and Arc3 from top to bottom.

As shown in the figure, therefore, the vehicle speed information IGca and IGcb can be displayed on map information 1860*b* in the first display 180*a*, the contact information OBJc can be displayed on map information 1870*b* in the second display 180*b*, and map information 1880*b* can be displayed on the third display 180*m*.

Figure 18C:
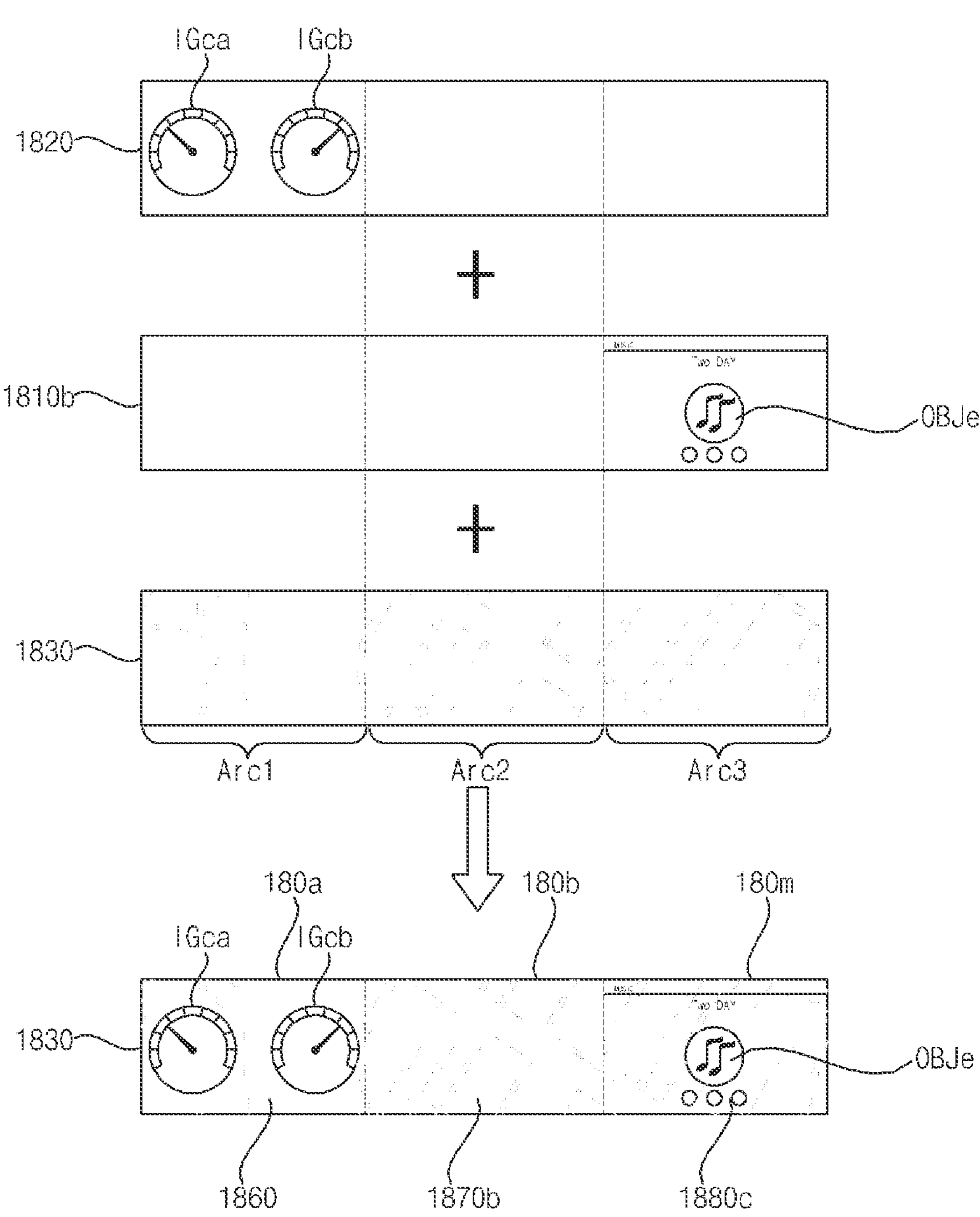

FIG. 18C illustrates that a first virtual overlay 1820, a second virtual overlay 1810*b*, and a third virtual overlay 1830 can be sequentially disposed from top to bottom, similarly to FIG. 18B.

The first virtual machine 520 can sequentially dispose a first virtual overlay 1820 including vehicle speed information IGca and IGcb in a first area Arc1, a second virtual overlay 1810*b* including contact information OBJe in a third area Arc3, and a third virtual overlay 1830 including map information in all areas Arc1, Arc2, and Arc3 from top to bottom.

In some implementations, the first virtual machine 520 can enlarge the contact information OBJe, and can be configured to display or dispose the enlarged contact information OBJe in the third area Arc3.

As shown in the figure, therefore, the vehicle speed information IGca and IGcb can be displayed on map information 1860 in the first display 180*a*, map information 1870*b* can be displayed in the second display 180*b*, and the enlarged contact information OBJe can be displayed on map information 1880*c* in the third display 180*m*.

Figure 18D:
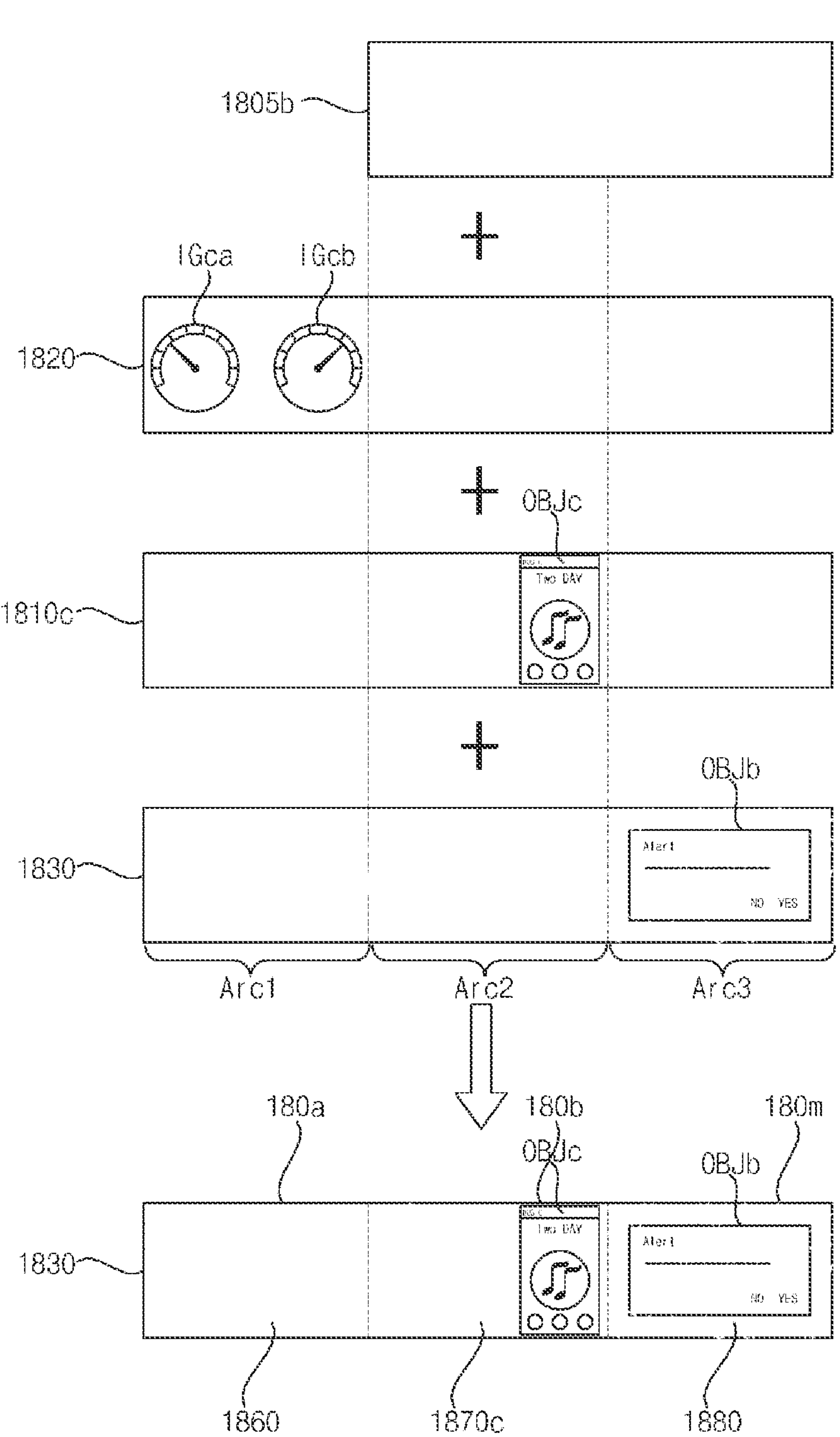

FIG. 18D illustrates that a first virtual overlay 1820, a second virtual overlay 1810*c*, and a third virtual overlay 1830 can be sequentially disposed from top to bottom, similarly to FIG. 18B.

In some implementations, a fourth virtual overlay 1805*b* can be displayed on the first virtual overlay 1820.

In some implementations, the third virtual overlay 1830 can include map information in all areas Arc1, Arc2, and Arc3, and can further include message information OBJb in the third area Arc3.

For example, the first virtual machine 520 can sequentially dispose a fourth virtual overlay 1805*b*, a first virtual overlay 1820 including vehicle speed information IGca and IGcb in a first area Arc1, a second virtual overlay 1810*c* including contact information OBJc in a second area Arc2, and a third virtual overlay 1830 including map information in all areas Arc1, Arc2, and Arc3 and message information OBJb in the third area Arc3 from top to bottom.

As shown in the figure, therefore, map information 1860 can be displayed on the first display 180*a*, the contact information OBJc can be displayed on map information 1870*c* in the second display 180*b*, and the message information OBJa can be displayed on map information 1880 in the third display 180*m*.

Figure 18E:
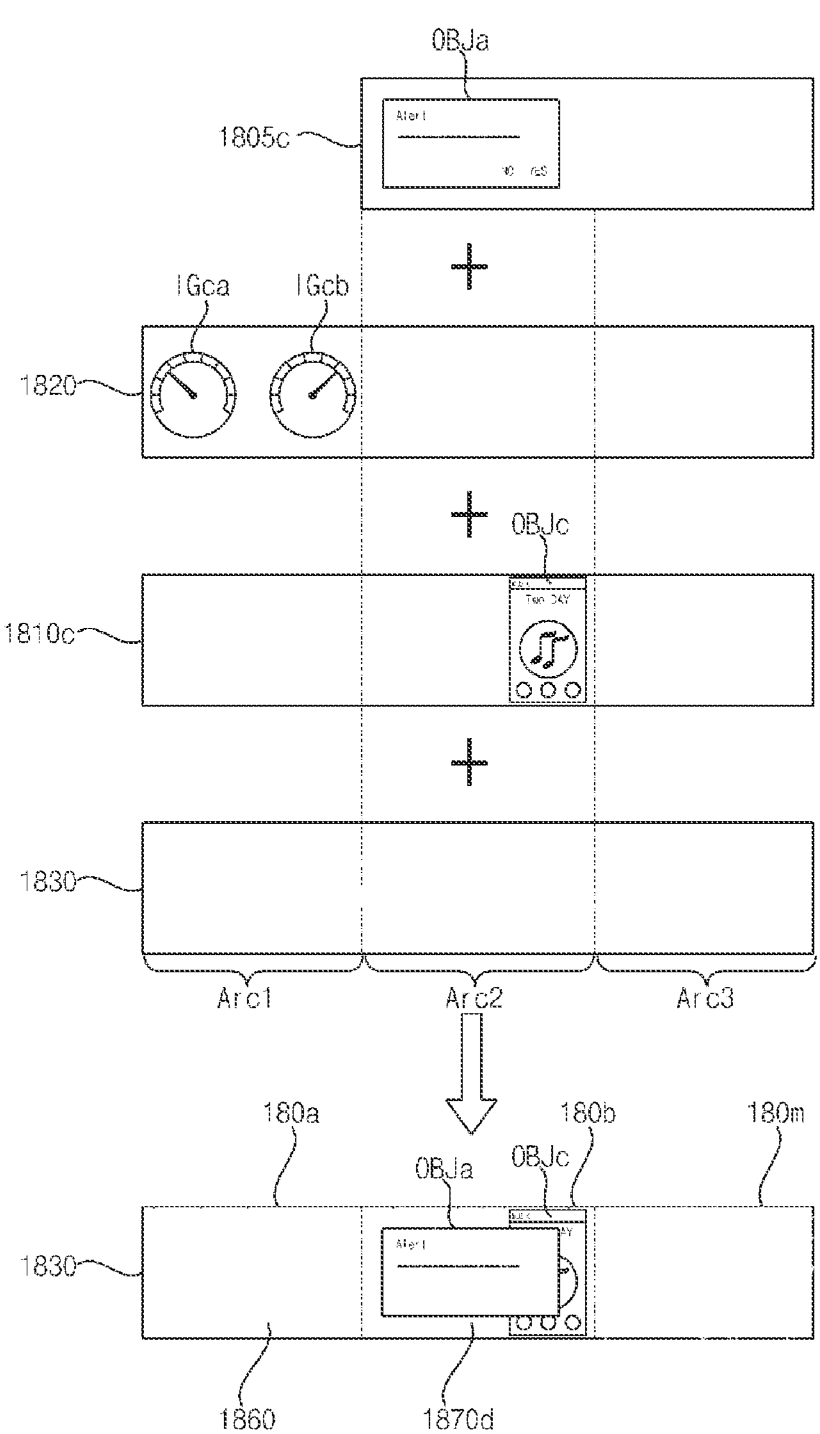

FIG. 18E illustrates that a fourth virtual overlay 1805*c*, a first virtual overlay 1820, a second virtual overlay 1810*c*, and a third virtual overlay 1830 can be sequentially disposed from top to bottom, similarly to FIG. 18D.

The first virtual machine 520 can sequentially dispose a fourth virtual overlay 1805*c* including message information OBJa in a second area Arc2, a first virtual overlay 1820 including vehicle speed information IGca and IGcb in a first area Arc1, a second virtual overlay 1810*c* including contact information OBJc in the second area Arc2, and a third virtual overlay 1830 including map information in all areas Arc1, Arc2, and Arc3 from top to bottom.

As shown in the figure, therefore, map information 1860 can be displayed on the first display 180*a*, the contact information OBJc can be displayed on map information 1870*d* in the second display 180*b*, and the message information can be displayed on the third display 180*m*.

Figure 19:
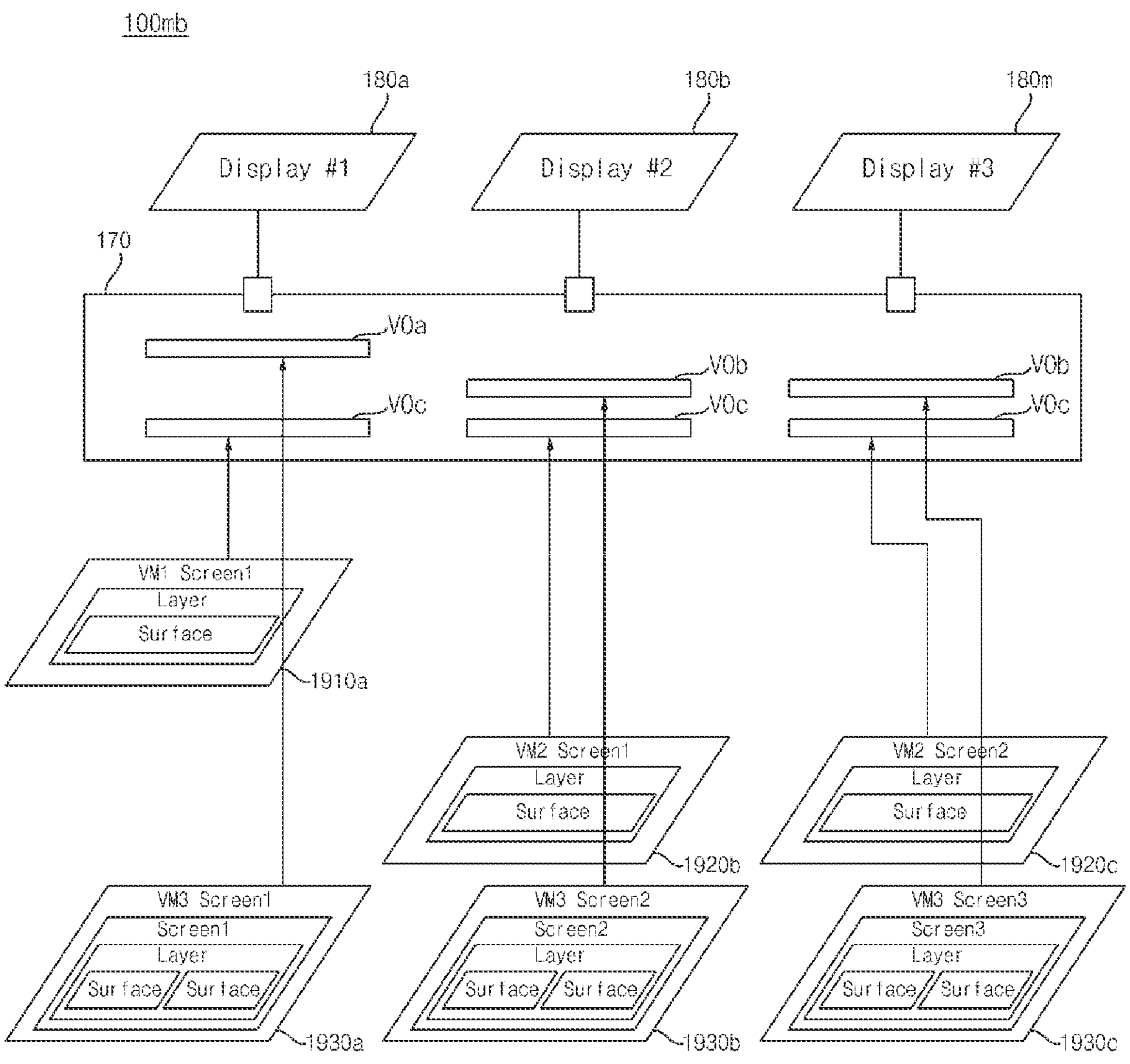

FIG. 19 is a diagram illustrating that a plurality of virtual overlays can be displayed on the first to third displays 180*a*, 180*b*, and 180*m* of a display apparatus 100*mb* for vehicle of FIG. 13.

Referring to the figure, a third virtual overlay 1930*a* generated by the third virtual machine 540 can be displayed on a first virtual overlay 1910*a* generated by the first virtual machine 520, whereby a composite overlay VOa and VOc can be displayed on the first display 180*a*.

Referring to the figure, a third virtual overlay 1930*b* generated by the third virtual machine 540 can be displayed on a second virtual overlay 1920*b* generated by the second virtual machine 530, whereby a composite overlay VOb and VOc can be displayed on the second display 180*b*.

Referring to the figure, a third virtual overlay 1930*c* generated by the third virtual machine 540 can be displayed on a second virtual overlay 1920*c* generated by the second virtual machine 530, whereby a composite overlay VOa and VOc can be displayed on the third display 180*m*.

Figure 20:
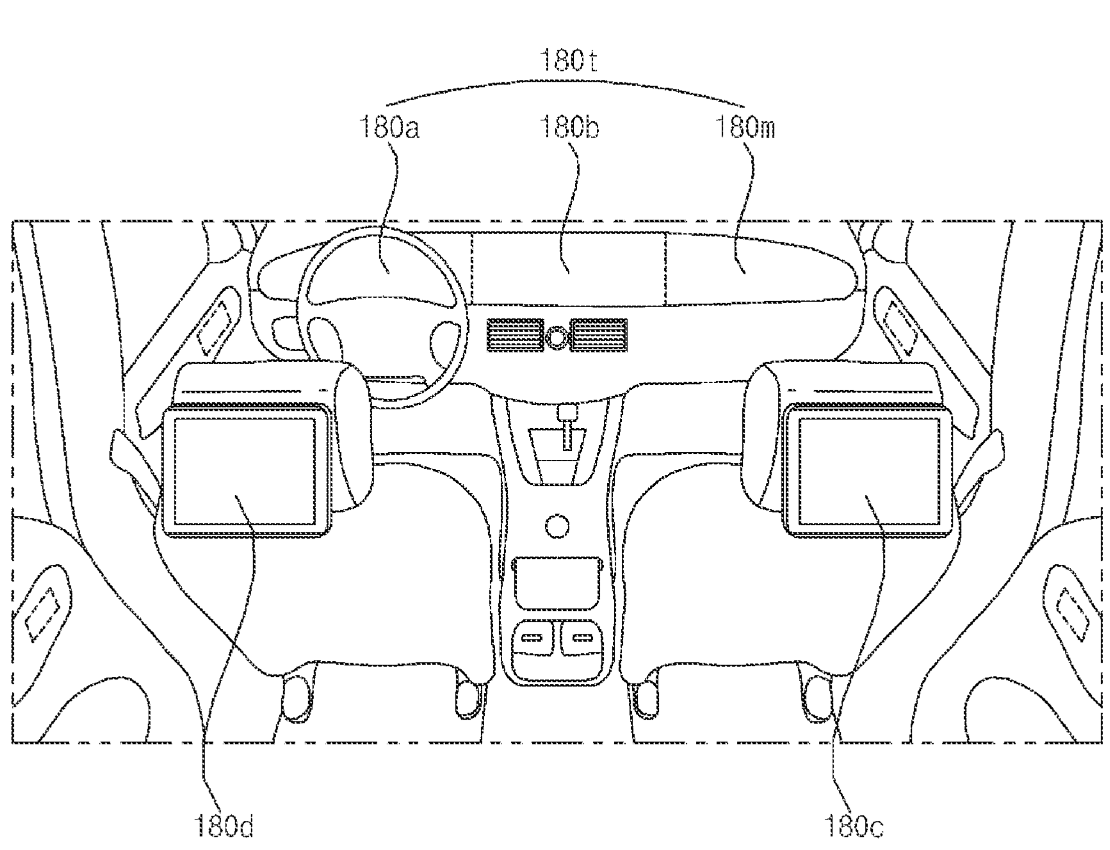
FIG. 20 is a diagram illustrating another example of an external appearance of a display apparatus for vehicle.

FIG. 20 is a diagram illustrating another example of an external appearance of a display apparatus for vehicle.

Referring to the figure, the display apparatus 100 for vehicle can include a plurality of displays 180*a*, 180*b*, and 180*m* extending from a driver's seat to a passenger seat, rear seat entertainment displays 180*c* and 180*d*, and a signal processing device 170 configured to perform signal processing to display images and information on the displays 180*a*, 180*b*, 180*m*, 180*c*, and 180*d*.

The plurality of displays 180*a*, 180*b*, and 180*m* can be disposed in a single frame.

For example, the plurality of displays 180*a*, 180*b*, and 180*m* can be implemented as a single seamless display 180*t*.

Among the plurality of displays 180*a*, 180*b*, and 180*m*, the first display 180*a* can be a cluster display, the second display 180*b* can be an AVN display, and the third display 180*m* can be a passenger seat display. The fourth display 180*c* can be a first RSE display, and the fifth display 180*d* can be a second RSE display.

In some implementations, the signal processing device 170 can have a processor 175 provided therein, and can execute first to sixth virtual machines 520 to 570 on a hypervisor 505 in the processor 175.

The second virtual machine 530 can be operated for the first display 180*a*, the third virtual machine 540 can be operated for the second display 180*b*, the fourth virtual machine 550 can be operated for the third display 180*m*, the fifth virtual machine 560 can be operated for the fourth display 180*c*, and the sixth virtual machine 570 can be operated for the fifth display 180*d*.

Figure 21:
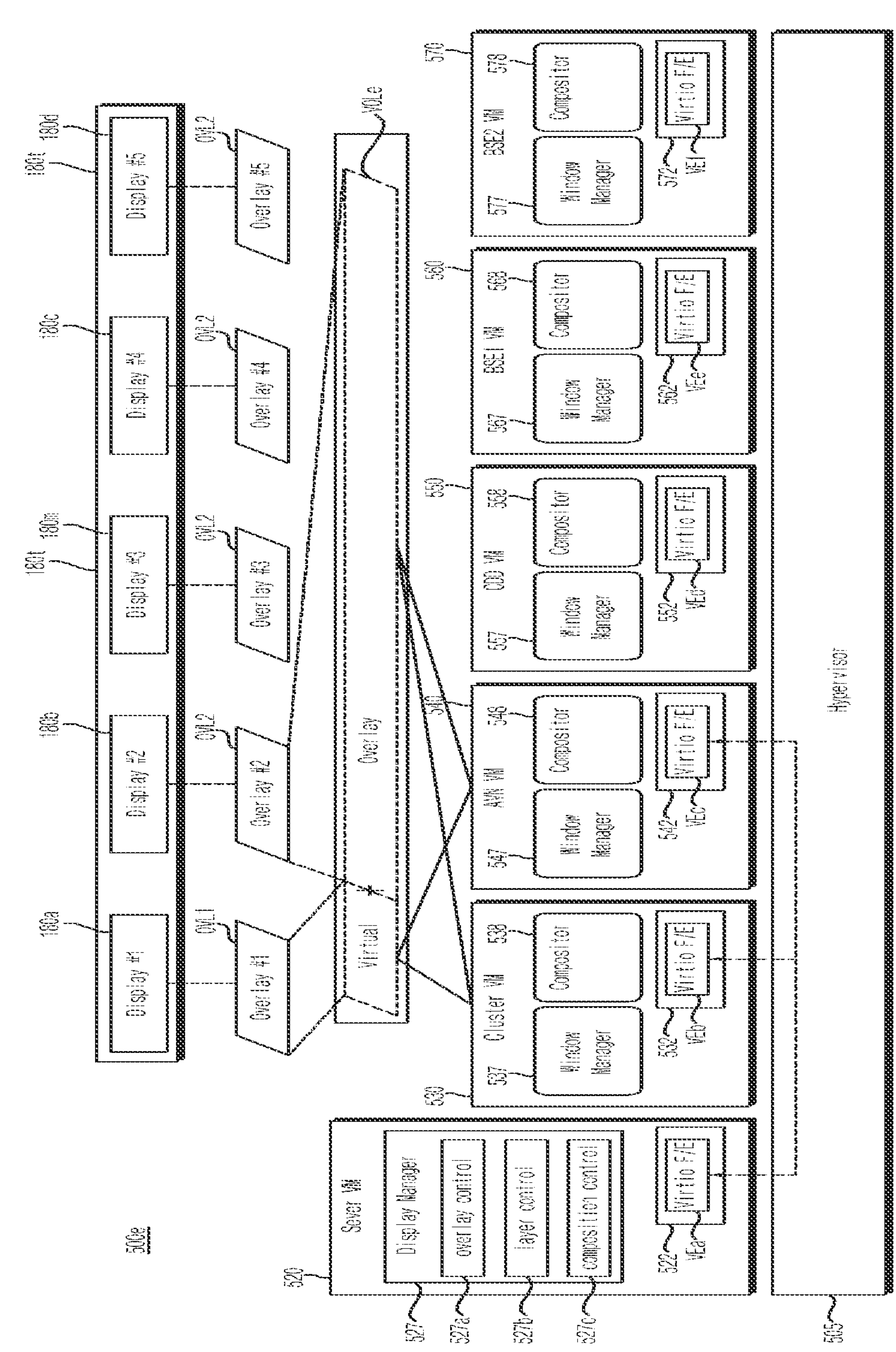
FIGS. 21 and 22 are diagrams referred to in the description of FIG. 20.
Figure 22:
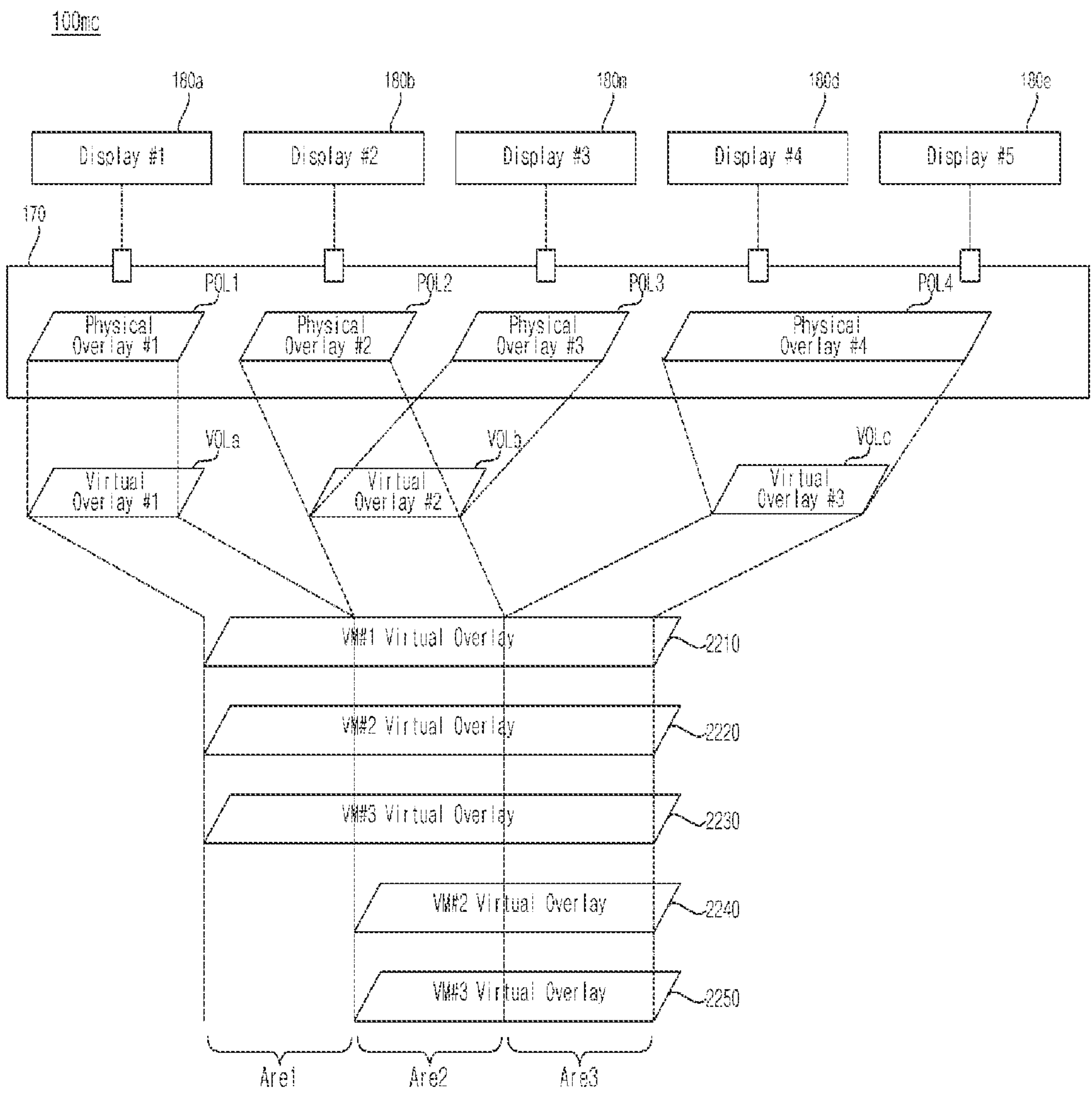

FIGS. 21 and 22 are diagrams referred to in the description of FIG. 20.

FIG. 21 is a diagram describing another example of display of overlays in the system driven in the signal processing device.

Referring to the figure, in the system 500*e* of FIG. 21, the processor 175 in the signal processing device 170 can drive the hypervisor 505, and execute the first virtual machine 520, the second virtual machine 530, the third virtual machine 540, the fourth virtual machine 550, the fifth virtual machine 560, and the sixth virtual machine 570 on the hypervisor 505.

In some implementations, the system 500*e* of FIG. 21 may be different from the system 500*d* of FIG. 14 in that the fifth virtual machine 560 and the sixth virtual machine 570 are further executed.

Consequently, for a description of the first virtual machine 520, the second virtual machine 530, the third virtual machine 540, and the fourth virtual machine 550, refer to FIG. 14, and the fifth virtual machine 560 and the sixth virtual machine 570 will be mainly described hereinafter.

In some implementations, the first virtual machine 520 can change the layer sequence or display area of a virtual overlay, and transmit the changed virtual overlay or information regarding the changed virtual overlay to the second virtual machine 530, the third virtual machine 540, the fourth virtual machine 550, the fifth virtual machine 560, or the sixth virtual machine 570 for displaying the changed virtual overlay on the first display 180*a*, the second display 180*b*, or the third display 180*m*.

Consequently, the display sequence and display area of the plurality of overlays can be changed. In addition, the display sequence and display area of the plurality of overlays can be changed even though the number of virtual machines that are driven is increased.

In some implementations, the fifth virtual machine 560 or the sixth virtual machine 570 can combine the changed virtual overlay with each physical overlay, and can be configured to control the fourth display 180*c* or the fifth display 180*d* to display the composite overlay related to the combined overlay. Consequently, the composite overlay can be displayed on the display.

In some implementations, a first virtual machine 520 can be configured to generate a virtual overlay and transmit the virtual overlay to a fifth virtual machine 560 or a sixth virtual machine 570, and the fifth virtual machine 560 or the sixth virtual machine 570 can be configured to change the layer sequence or display area of the virtual overlay in response to the virtual overlay being displayed on the fourth display 180*c* or the fifth display 180*d*.

Consequently, the display sequence and display area of the plurality of overlays can be changed. In addition, the display sequence and display area of the plurality of overlays can be changed even though the number of virtual machines that are driven is increased.

In some implementations, an input and output client interface 562 in the fifth virtual machine 560 can include a front interface VEe configured to receive a command for constructing the virtual overlay from the first virtual machine 520 or to transmit a command for constructing the virtual overlay to the first virtual machine 520.

In some implementations, the fifth virtual machine 560 can include a window manager 567 configured to control a window of an image in which an overlay will be generated or displayed and a compositor 568 configured to combine overlays or windows generated by the fifth virtual machine 560.

In some implementations, the input and output client interface 572 in the sixth virtual machine 570 can include a front interface VEf configured to receive a command for constructing the virtual overlay from the first virtual machine 520 or to transmit a command for constructing the virtual overlay to the first virtual machine 520.

In some implementations, the sixth virtual machine 570 can include a window manager 577 configured to control a window of an image in which an overlay will be generated or displayed and a compositor 578 configured to combine overlays or windows generated by the sixth virtual machine 570.

In some implementations, the first virtual machine 520 to the sixth virtual machine 570 can transmit or receive virtual overlays using the shared memory 508, as described with reference to FIGS. 8, 9A, and 9B.

In some implementations, the first virtual machine 520 can change the construction of the layer displayed on the first display 180*a*, the second display 180*b*, the third display 180*m*, the fourth display 180*c*, or the fifth display 180*d* during run time. Consequently, the construction of the layer displayed during run time can be changed.

FIG. 22 is a diagram referred to in the description of FIG. 21.

For example, FIG. 22 is a diagram referred to in describing display of an image using a plurality of virtual overlays.

Referring to the figure, each of the first virtual machine 520, the second virtual machine 530, and the third virtual machine 540 can generate a first virtual overlay 2210, a second virtual overlay 2220, and a third virtual overlay 2230, each including a first area Are1, a second area Are2, and a third area Are3.

In some implementations, each of the second virtual machine 530 and the third virtual machine 540 can generate a fourth virtual overlay 2240 and a fifth virtual overlay 2250, each including a second area Are2 and a third area Are3.

The second virtual machine 530 can be configured to control the first display 180*a* to display a composite overlay generated by disposing a physical overlay POL1 on virtual overlays VOLa corresponding to the first area Are1, among the first to fifth overlays 2210 to 2250.

The third virtual machine 540 can be configured to control the second display 190*b* to display a composite overlay generated by disposing a physical overlay POL2 on virtual overlays VOLb corresponding to the second area Are2, among the first to fifth overlays 2210 to 2250.

The fourth virtual machine 550 can be configured to control the third display 180*m* to display a composite overlay generated by disposing a physical overlay POL3 on virtual overlays VOLb corresponding to the second area Are2, among the first to fifth overlays 2210 to 2250.

The fifth virtual machine 560 can be configured to control the fourth display 180*c* to display a composite overlay generated by disposing a physical overlay POL4 on virtual overlays VOLc corresponding to the third area Are3, among the first to fifth overlays 2210 to 2250.

The sixth virtual machine 570 can be configured to control the fifth display 180*d* to display a composite overlay generated by disposing a physical overlay POL3 on virtual overlays VOLc corresponding to the third area Are3, among the first to fifth overlays 2210 to 2250.

In some implementations, the physical overlay POL3 can have a size that can be displayed in both the fourth display 180*c* and the fifth display 180*d*, as shown in the figure.

What is claimed is:

1. A signal processing device comprising:

a processor configured to perform signal processing for a first display and a second display that are configured to be located in a vehicle, wherein:

the processor is configured to execute first, second, and third virtual machines on a hypervisor in the processor, the second virtual machine is configured to be operated for the first display, the third virtual machine is configured to be operated for the second display, and the first virtual machine is configured to:

generate a virtual overlay, change at least one of a layer sequence or a display area of the virtual overlay, and transmit, to the second virtual machine or the third virtual machine, the changed virtual overlay for displaying the changed virtual overlay on the first display or the second display using a shared memory based on the hypervisor, the first virtual machine includes an output server interface for data communication with the second virtual machine and the third virtual machine, and the second virtual machine includes an input and output client interface for data communication with the first virtual machine.

2. The signal processing device of claim 1, wherein the second virtual machine or the third virtual machine is configured to:

combine the changed virtual overlay with a physical overlay, and control the first display or the second display to display a composite overlay related to the combined overlay.

3. The signal processing device of claim 2, wherein combining the changed virtual overlay with the physical overlay comprises mapping the virtual overlay to the physical overlay.

4. The signal processing device of claim 2, wherein combining the changed virtual overlay with the physical overlay comprises mapping the virtual overlay to one or more overlays in the physical overlay.

5. The signal processing device of claim 1, wherein the first virtual machine is configured to delete the virtual overlay or add another virtual overlay.

6. The signal processing device of claim 1, wherein:

each of the second virtual machine and the third virtual machine is configured to generate a virtual overlay, and the first virtual machine is configured to set at least one of an overlay sequence or a display area of the virtual overlays generated by the second virtual machine and the third virtual machine.

7. The signal processing device of claim 6, wherein the first virtual machine is configured to change the at least one of the overlay sequence or the display area of the virtual overlays generated by the second virtual machine and the third virtual machine.

8. The signal processing device of claim 1, wherein:

the processor is configured to execute a fourth virtual machine configured to be operated for a third display configured to be located in the vehicle, each of the second, third, and fourth virtual machines is configured to generate a virtual overlay, and the first virtual machine is configured to set at least one of an overlay sequence or a display area of the virtual overlays generated by the second, third, and fourth virtual machines.

9. The signal processing device of claim 1, wherein the first virtual machine is configured to change a construction of a layer displayed on the first display or the second display while the first display or the second display is operated.

10. The signal processing device of claim 1, wherein the first virtual machine is configured to generate the virtual overlay displayed on the first display and the second display.

11. The signal processing device of claim 1, wherein the first virtual machine is configured to move the generated virtual overlay and control the first display or the second display to display the moved virtual overlay.

12. The signal processing device of claim 1, wherein:
the first virtual machine is configured to generate a first virtual overlay comprising vehicle speed information,
the second virtual machine is configured to generate a second virtual overlay comprising content information or contact information,
the third virtual machine is configured to generate a third virtual overlay comprising map information, and
the first virtual machine is configured to control the first display or the second display to display at least one of the first, second, or third virtual overlays.

13. The signal processing device of claim 12, wherein the first virtual machine is configured to:
control the first display to display the vehicle speed information and the contact information, and
control the second display to display the map information and speed limit information.

14. The signal processing device of claim 1, wherein:
the processor is configured to execute a fourth virtual machine configured to be operated for a third display configured to be located in the vehicle,
the first virtual machine is configured to generate a first virtual overlay comprising vehicle speed information,
the second virtual machine is configured to generate a second virtual overlay comprising content information or contact information,
the third virtual machine is configured to generate a third virtual overlay comprising map information, and
the first virtual machine is configured to control the first, second, and third displays to display at least one of the first, second, or third virtual overlays.

15. The signal processing device of claim 14, wherein the first virtual machine is configured to:
control the first display to display the vehicle speed information above the map information;
control the second display to display the contact information above the map information; and
control the third display to display the map information.

16. The signal processing device of claim 15, wherein the first virtual machine is configured to, based on message information being received, control second display to display the message information above the contact information or the map information.

17. The signal processing device of claim 1, wherein the first virtual machine is configured to:
move an object on a plurality of virtual overlays, and
control a plurality of displays to display the moved object.

18. The signal processing device of claim 1, wherein:
the first virtual machine comprises a display manager that includes an overlay controller configured to control an overlay, a layer controller configured to control a layer, and a composition controller configured to control a construction or sequence of the layer, and
each of the second virtual machine and the third virtual machine comprises a window manager configured to display a window of the layer.

19. A signal processing device comprising:
a processor configured to perform signal processing for a first display and a second display that are configured to be located in a vehicle, wherein:
the processor is configured to execute first, second, and third virtual machines on a hypervisor in the processor,
the second virtual machine is configured to be operated for the first display,
the third virtual machine is configured to be operated for the second display,
the first virtual machine is configured to generate a virtual overlay and transmit the virtual overlay to the second virtual machine or the third virtual machine,
the second virtual machine or the third virtual machine is configured to, based on the virtual overlay being displayed on the first display or the second display, change at least one of a layer sequence or a display area of the virtual overlay using a shared memory based on the hypervisor,
the first virtual machine includes an output server interface for data communication with the second virtual machine and the third virtual machine, and
the second virtual machine includes an input and output client interface for data communication with the first virtual machine.

20. A display apparatus for vehicle, the display apparatus comprising:
a first display;
a second display; and
a signal processing device comprising a processor configured to perform signal processing for the first display and the second display, wherein:
the processor is configured to execute first, second, and third virtual machines on a hypervisor in the processor,
the second virtual machine is configured to be operated for the first display,
the third virtual machine is configured to be operated for the second display, and
the first virtual machine is configured to:
generate a virtual overlay,
change at least one of a layer sequence or a display area of the virtual overlay, and
transmit, to the second virtual machine or the third virtual machine, the changed virtual overlay or information regarding the changed virtual overlay for displaying the changed virtual overlay on the first display or the second display using a shared memory based on the hypervisor,
the first virtual machine includes an output server interface for data communication with the second virtual machine and the third virtual machine, and
the second virtual machine includes an input and output client interface for data communication with the first virtual machine.

* * * * *